United States Patent
Montjoy et al.

[11] Patent Number: 5,810,366
[45] Date of Patent: *Sep. 22, 1998

[54] TOOL-LESS MACHINE TOOL CHUCK

[75] Inventors: Kenneth M. Montjoy, Seneca; Roger J. Kanaan, Easley, both of S.C.

[73] Assignee: Power Tool Holders Incorporated, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 808,890

[22] Filed: Feb. 28, 1997

Related U.S. Application Data

[63] Continuation-in-part of Ser. No. 666,847, Jun. 19, 1996.

[51] Int. Cl.$^6$ .................................................. B23B 31/20
[52] U.S. Cl. ............................... 279/43; 279/50; 279/75; 279/904; 279/158
[58] Field of Search .................... 279/30, 42, 43, 279/43.1, 43.4, 43.5, 44, 45, 47, 49, 50, 74, 75, 903–905, 158

[56] References Cited

U.S. PATENT DOCUMENTS

| | | |
|---|---|---|
| 1,227,632 | 5/1917 | Lagerback . |
| 1,265,707 | 5/1918 | Berglund . |
| 1,353,299 | 9/1920 | Wilson . |
| 1,636,421 | 7/1927 | Knott . |
| 2,843,388 | 7/1958 | Butler . |
| 2,860,883 | 11/1958 | Better et al. . |
| 2,926,020 | 2/1960 | Dayton et al. . |
| 3,070,380 | 12/1962 | Holmberg . |
| 3,727,928 | 4/1973 | Benjamin . |
| 3,816,015 | 6/1974 | Bilz et al. . |
| 4,395,051 | 7/1983 | Tonomura . |
| 4,513,980 | 4/1985 | Kruse . |
| 4,525,111 | 6/1985 | Gutsche . |
| 4,570,952 | 2/1986 | Heimbigner et al. . |
| 4,692,073 | 9/1987 | Martindell . |
| 4,721,423 | 1/1988 | Kubo . |
| 4,799,838 | 1/1989 | Kubo et al. . |
| 4,808,049 | 2/1989 | Cook . |
| 4,867,463 | 9/1989 | Hopf . |
| 4,902,177 | 2/1990 | Burnett . |
| 4,989,887 | 2/1991 | Jordan . |
| 5,096,212 | 3/1992 | Walsh . |
| 5,193,824 | 3/1993 | Salpaka . |
| 5,301,961 | 4/1994 | Wozar . |
| 5,464,229 | 11/1995 | Salpaka . |

FOREIGN PATENT DOCUMENTS

| | | | |
|---|---|---|---|
| 31516 | 3/1980 | Japan | 279/43 |
| 58787 | 5/1947 | United Kingdom | 279/50 |

*Primary Examiner*—Steven C. Bishop
*Attorney, Agent, or Firm*—Dority & Manning

[57] ABSTRACT

The chuck includes a slitted body with an axial bore that holds the tool shank during rotation of the chuck. A gripping sleeve applies compressive pressure via cam elements to reduce the diameter of the axial bore. A spring biased locking sleeve can activate locking elements to lock the gripping sleeve to the body member in the locked position.

An engagement mechanism connects the chuck to a drive spindle and also has a mounting mechanism for facilitating automated mounting of the chuck to a drive spindle.

15 Claims, 18 Drawing Sheets

5,810,366

TOOL-LESS MACHINE TOOL CHUCK

BACKGROUND OF THE INVENTION

The present application is a Continuation-in-Part application of U.S. patent application Ser. No. 08/666,847 filed on Jun. 19, 1996.

The present invention relates to a quick-change chuck device that can be attached to a drive spindle of a machine tool and used for holding power bits or tools that are worked by the machine tool.

Any collet or chuck device utilized for holding a power bit, for example a router bit, to a drive spindle of a machine tool must lock the power bit both axially and radially with respect to the drive spindle. In other words, the chuck must prevent the power bit from rotating circumferentially relative to the drive spindle and from moving axially toward and away from the drive spindle. This concern is especially important with high speed machine tools, such as routers, both for accuracy and safety considerations. With conventional systems, one relatively simple means for rotationally securing the tool bit consists of defining a hexagonal or other multi-sided profile on the end of the tool bit, which fits into a corresponding multi-sided recess formed in the chuck device. It is common for the operator to need to use either two wrenches or a wrench and a spindle lock in order to change a router bit.

With another solution, collet chucks utilize a compressible collet for axially and rotationally holding the tool bit. Collet chucks are useful in that they do not depend on a multi-sided configuration in the tool bit for holding the tool. Thus, any manner of power bits or tool bits having essentially round shank portions may be held by a collet chuck device. However, collet chuck devices do not have the quick-change or quick release capabilities that are desired in many applications. For example, it is highly desirable for portable tools such as routers or laminate trimmers to utilize quick-release chuck devices for relatively quick and easy change out of tool bits. However, with the conventional quick-release devices, the tool shank portions must be multi-sided to fit within corresponding bores defined in the quick-change chuck devices. It would be desirable in the art to have a quick-change chuck device which can be utilized with any manner of tool bit, including tool bits that have essentially round tool shanks, for increasing the versatility and ease of operation of machine tools utilizing such chuck devices. It also would be desirable to have a quick-change chuck device that could be automatically mounted and unmounted by machine.

Various devices are known in the art for use on portable stationary routers, laminate trimmers, drywall cutters, etc., for securing or holding power tools or power bits to a spindle of the machine tool. For example, various collet tool holding devices and quick release adapters are known in the art. U.S. Pat. No. 5,301,961 to Wozar describes one such chuck. Likewise, U.S. Pat. No. 4,692,073 to Martindell describes a chuck apparatus utilizing a spring-biased sleeve disposed about the drive spindle for axially securing the power bit to the chuck apparatus.

OBJECTS AND SUMMARY OF THE INVENTION

Therefore a principal object of the present invention is to provide a quick-change chuck device for securing a tool bit or working device to a driven spindle of a machine tool.

Another object of the present invention is to provide a quick-change chuck device that can be mounted to and unmounted from a machine tool by automated machine means.

A further object of the invention is to provide a versatile quick-change chuck device which is capable of holding tool bits having round tool shanks.

A yet further object of the present invention is to provide a fast-acting, quick-change chuck device in which a tool bit can be readily inserted and removed without having to align a multi-sided profile of the tool with a multi-sided bore in the chuck device.

Yet another object of the present invention is to provide a quick-change chuck device that overcomes lock-up of tool bits inside the chuck device.

Still another object of the present invention is to provide a quick-change chuck device that reduces any tendency of the chuck device to mark the shank of the tool.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the chuck includes a body member with a front end and a back end disposed opposite the front end. An axial bore configured to receive a cylindrical tool shank therein is defined axially in the body member beginning at the front end. The body member has an annular wall that further defines at least a first slit that extends axially therethrough from the front end toward the back end and radially from the exterior surface of the body member into the axial bore. The body member also defines a plurality of similar axially extending slits that are disposed symmetrically in a manner generally spaced apart from and parallel to one another around the circumference of the body member. The slits cooperate to render the body member flexible both diametrically and circumferentially so as to permit both expansion and contraction of the diameter and the circumference of the body member's axial bore upon the application of the appropriately directed forces. In a presently preferred embodiment, a relief hole is disposed at the end of each slit that is farthest from the front end of the body member.

The body member further includes at least one axially extending cam pocket defined therein and disposed near the front end. The cam pocket is configured for receiving at least part of a cam element therein. In a preferred embodiment, the cam pocket is configured with a canted floor wherein the radial distance between the floor and the central longitudinal axis decreases when proceeding from the relatively shallow portion, which is disposed closer to the back end, toward the relatively deep portion, which is disposed closer to the front end. The exterior surface of the body member further defines at least one locking socket therein and configured for receiving at least part of a locking element therein.

The chuck device of the present invention desirably includes a plurality of cam elements. At least one cam element is selectively seated against the floor of the cam pocket, wherein in a gripping position the cam element is forced against the relatively shallow portion of the floor of the body member so as to apply increased pressure that reduces relatively the diameter of the axial bore to grip the tool shank. In a release position the cam element is forced against the relatively deep portion of the floor of the body member so as to apply reduced pressure that increases relatively the diameter of the axial bore to release the tool shank.

The pressure is applied to the cam elements by the action of a gripping sleeve member that defines an inner surface configured and disposed coaxially about the body member and axially movable relative to the body member. The inner surface of the gripping sleeve member includes at least one cam element engaging surface defined therein and receiving the at least one cam element at least partially therein. The gripping sleeve member further defines at least one locking channel therethrough and configured for receiving at least part of a locking element therein.

A presently preferred embodiment of the chuck device of the present invention desirably includes a plurality of locking elements. At least one locking element is disposed at least partially in the locking channel of the gripping sleeve and configured to move radially therein between one of a locked position and an unlocked position. When in the locked position, the locking element is forced at least partially into the locking socket of the body member so as to prevent relative axial movement between the body member and the gripping sleeve. When in the unlocked position, the locking element is free to move radially out of the locking socket of the body member so as to permit relative axial movement between the body member and the gripping sleeve.

A presently preferred embodiment of the chuck device of the present invention desirably includes a locking sleeve member disposed coaxially about the gripping sleeve member and axially movable relative to the gripping sleeve member. The locking sleeve member defines a forward end and a rearward end disposed opposite the forward end. The rearward end of the locking sleeve member is configured to activate the locking element when the locking sleeve is disposed in a locked position and to release the locking element when the locking sleeve is disposed in an unlocked position.

A presently preferred embodiment of the chuck device of the present invention desirably includes an axial spring mechanism disposed relative to the gripping sleeve member and the locking sleeve member so as to bias the locking sleeve member axially relative to the gripping sleeve member to the locked position wherein the locking sleeve member activates the locking element. The locking sleeve member is axially movable against the biasing force of the spring mechanism to an unlocked position wherein the locking sleeve member releases the locking element.

The chuck device of the present invention desirably includes an annular cage member that is disposed coaxially between the body member and the gripping sleeve member. The annular cage member is axially movable relative to the body member and defines a plurality of cage openings in equal number to the number of cam elements. Each cage opening is configured to receive one cam element and retain the cam element therein. The cage member further defines an alignment tab engaging the first slit of the body member and thereby maintaining alignment of the cam elements relative to the first slit during axial movement of the cam elements from the gripping position to the release position. Desirably, a plurality of tabs is provided so that one tab is disposed in each slit of the body member.

When the chuck device is in use holding a shank of a tool bit, the cam elements are disposed in their gripping positions. In particular, radially directed force acts to compress the diameter of the axial bore of the body member around the tool shank disposed within the axial bore. The compressive force exerted by the gripping sleeve on the body member via the cam elements suffices to retain the shank of the tool nonrotatably in place within the axial bore while the chuck is rotating during use of the tool under load.

An engagement mechanism is provided for operably connecting both the above-described chuck body as well as any other chuck body, to a drive spindle. The engagement mechanism can include a female threaded receiving portion at an end of the body member for threaded engagement with a male threaded driving spindle. Alternatively, the engagement mechanism can include a male threaded engaging portion at an end of the body member for threaded engagement with a female threaded receiving portion of a driving spindle. Alternatively, the engagement mechanism can include a tapered female unthreaded receiving portion at an end of the body member and configured for engagement with a male tapered mount at the end of a driving spindle. The engagement mechanism also can include a mounting mechanism for facilitating automated mounting of the chuck device to a driving spindle, preferably via the body member of the chuck device. The mounting mechanism can include at least one of the group consisting of an opening configured for receiving a retaining screw, a Torx head tool, an Allen head tool, and a square head tool.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description. In addition, comparable elements of different embodiments are designated by numerals that differ numerically by a factor of 100.

A preferred embodiment of the quick-change chuck device of the present invention is shown in FIGS. 1–4C, 9A and 9B in the form of a tool-less machine tool chuck, which is a chuck that does not require the operator to use a separate tool in order to release or secure the shank 23, 123 of the working tool in the chuck. An alternative embodiment of a tool-less machine tool chuck of the present invention is shown in FIGS. 5–9B. The quick-change, tool-less machine tool chuck device of the present invention is represented generally in FIGS. 1, 2, 5, and 7 by the numerals 10, 110, depending on the particular embodiment. As shown in phantom (dashed line) in FIG. 1, the tool-less machine tool chuck device of the present invention can be used to hold the shank 23 of a tool such as a router bit 27.

Figure 1:
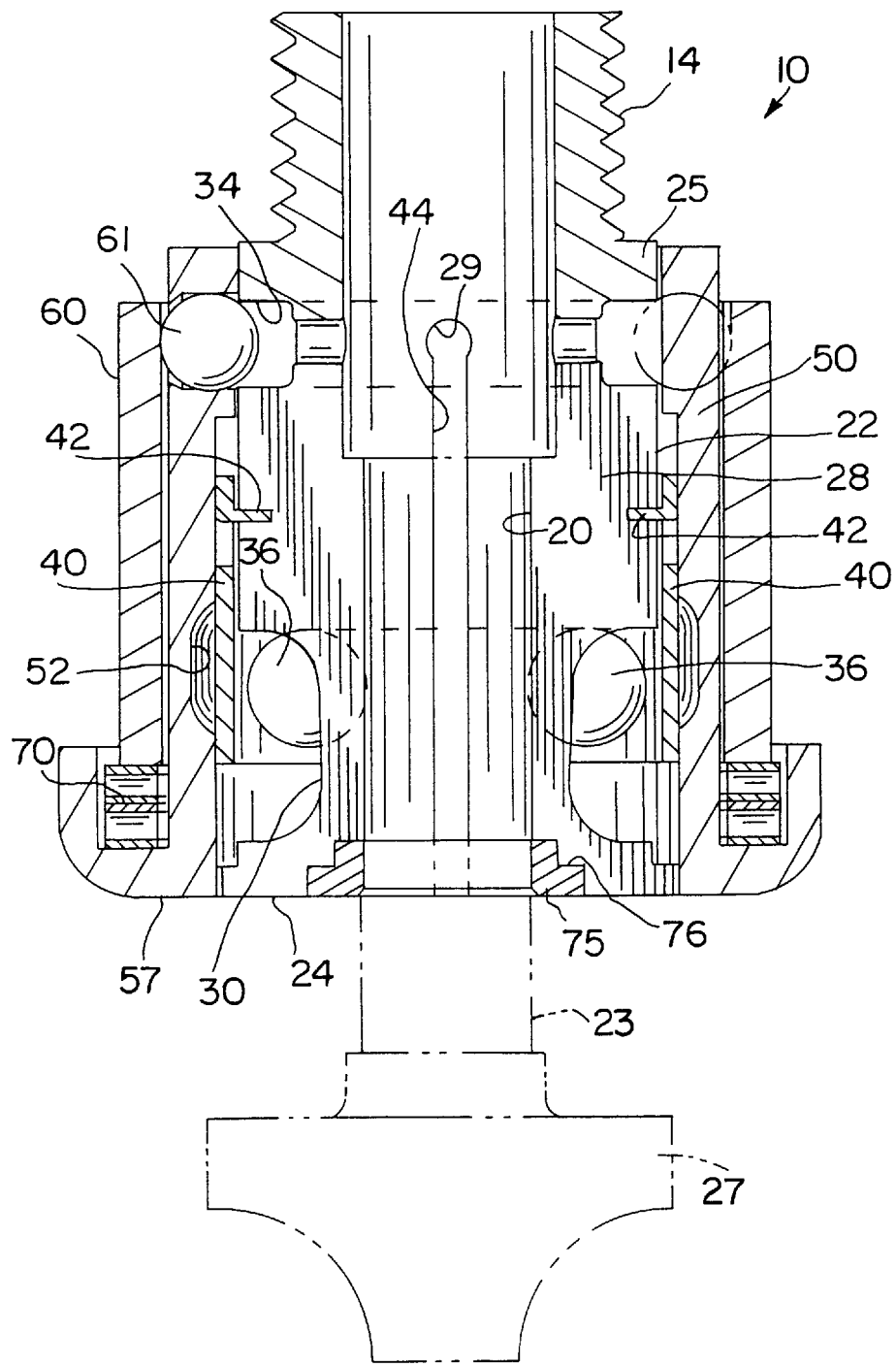
FIG. 1 is an axial cross-sectional view of a presently preferred embodiment of the chuck device of the present invention locked about the shaft of a tool bit, which is shown in phantom (chain dashed line)
Figure 5:
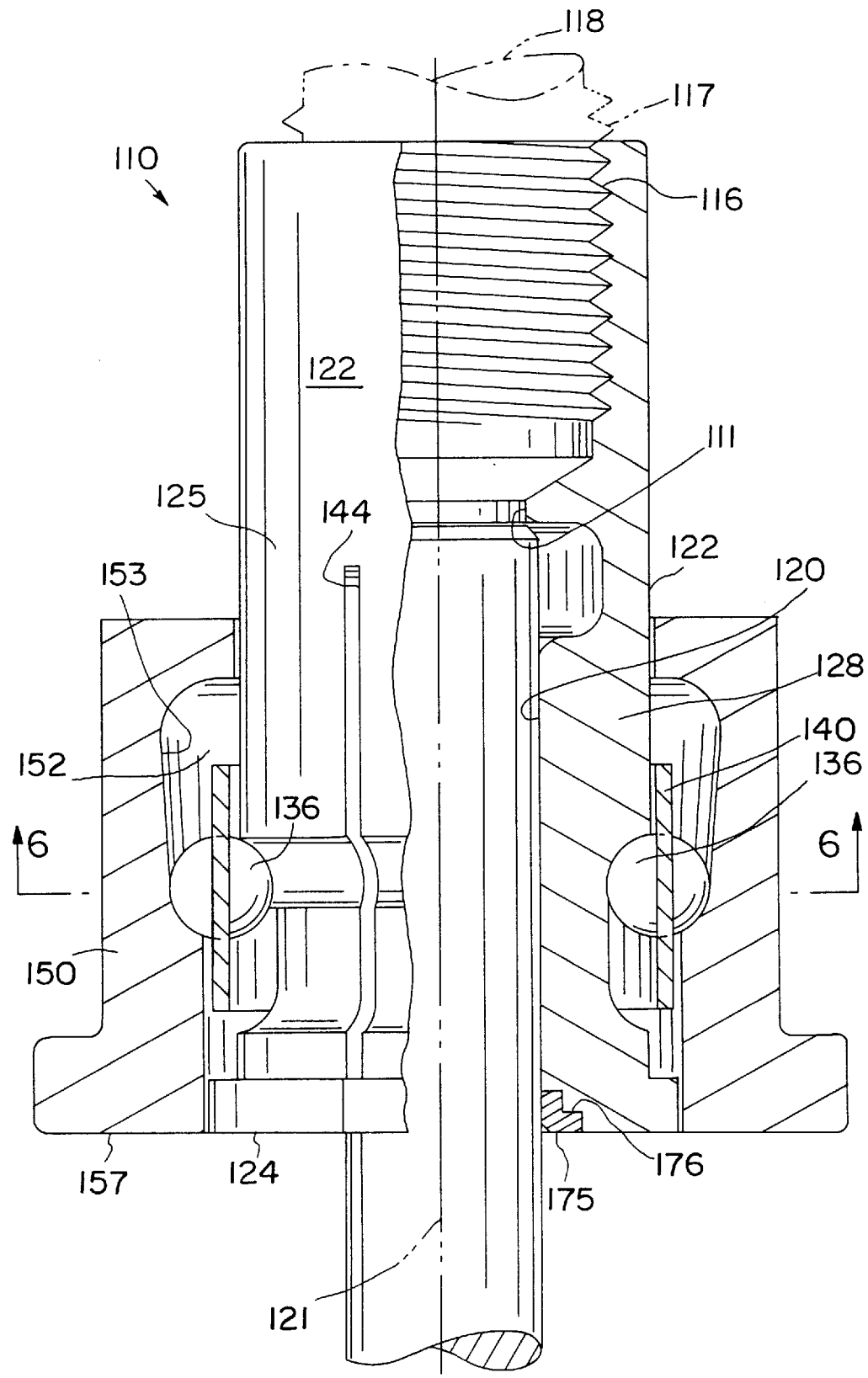
FIG. 5 is an axial view partially in perspective and partially in cross-section, of an alternative embodiment of the chuck device of the present invention gripping the shaft of a tool bit, with the drive spindle shown in phantom (chain dashed line)

The tool-less machine tool chuck device of the present invention includes a body member that has a front end disposed opposite a back end. The front end is disposed toward the tool to be received by the chuck. The back end is disposed toward the drive spindle of the machine that powers the tool. As shown in FIG. 1 for example, a body member 25 is configured to be driven by a threaded female drive spindle (not shown). As shown in FIG. 5 for example, a body member 125 is configured to be driven by a drive spindle 118 shown in phantom (dashed line) with a threaded male portion 117.

Figure 4A:
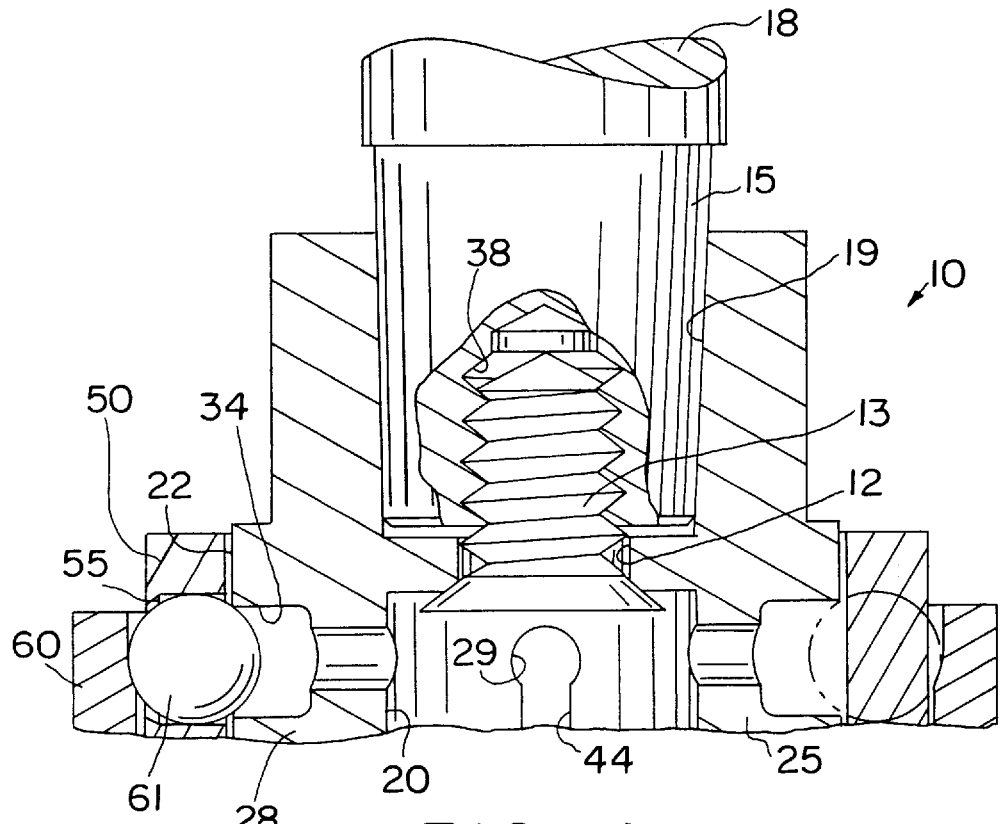
FIGS. 4A, 4B, and 4C are axial cross-sectional views of alternative embodiments of engagement mechanisms for connecting the chuck to the drive spindle of a machine tool.
Figure 4B:
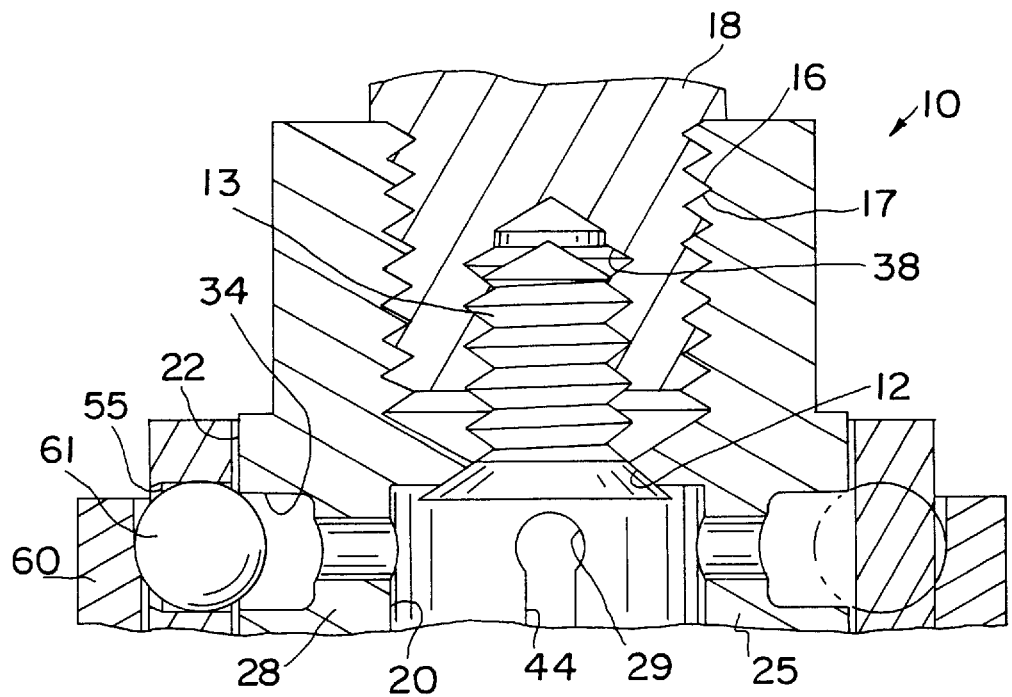
Figure 4C:
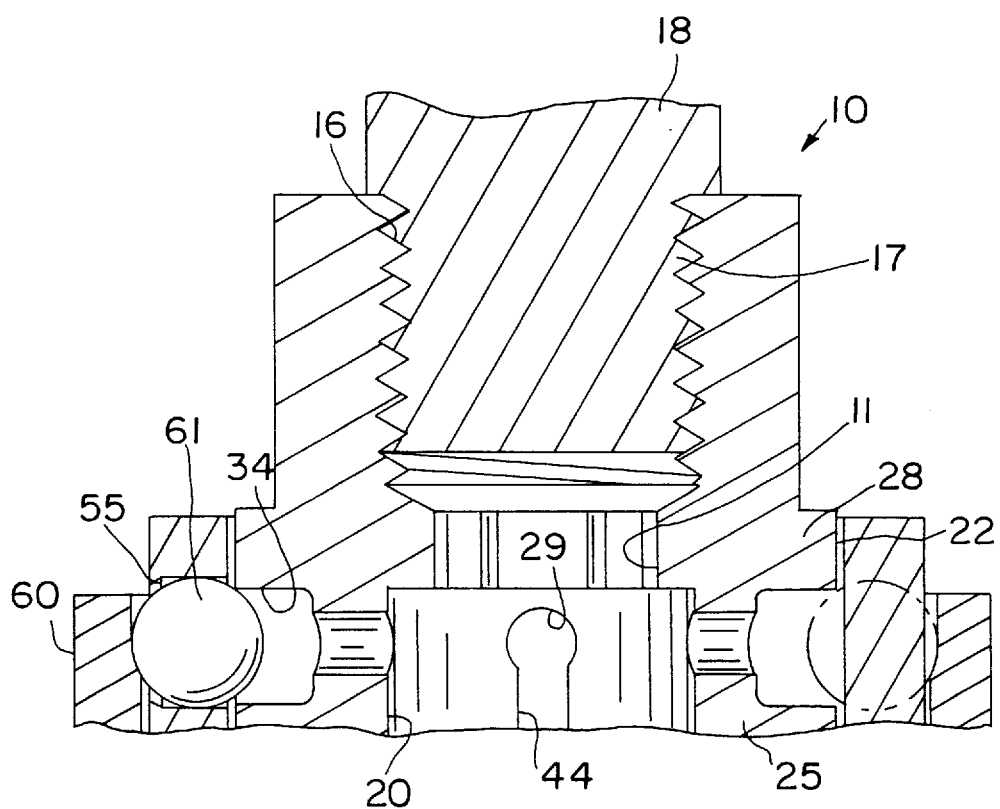

In accordance with the present invention, an engagement mechanism is provided for operably connecting a chuck device to a drive spindle. The engagement mechanism is applicable generally to any type of chuck device, and various configurations of the engagement mechanism may be utilized to mate chuck devices with drive spindles. As shown in FIGS. 4B and 4C for example, body 25 may include a female threaded receiving section or portion 16 defined in the back end of body 25 for engagement with a male threaded portion 17 of drive spindle 18. Similarly, as shown in FIG. 5 for example, body 125 may comprise a female threaded receiving section or portion 116 defined in the back end of body 125 for engagement with a male threaded portion 117 (in phantom) of drive spindle 118. Alternatively, as shown in FIG. 4A for example, the engagement mechanism can include a tapered female unthreaded receiving portion 19 disposed in the back end of body member 25 and configured for engagement with a male tapered mount 15 at the end of driving spindle 18. In a further alternative embodiment of the engagement mechanism shown in FIGS. 1 and 2 for example, body member 25 may comprise a male threaded portion 14 for engagement with a female threaded receiving portion configured in a drive spindle (not shown). In yet another alternative embodiment of the engagement mechanism, the body member may comprise a male tapered portion for engagement with a female tapered receiving portion configured in a drive spindle (not shown). Moreover, in still another alternative embodiment of the invention, body member 25, 125 may be defined in the drive spindle itself. In other words, the drive spindle 18, 118 and the body member 25, 125, respectively, would constitute a unitary structure. And in yet another alternative preferred embodiment, chuck device 10, 110 may be configured as an insert device which is insertable into a receiving socket of a drive spindle. In this socket embodiment, chuck device 10, 110 may be held in the socket by any conventional means, such as a set screw (not shown) engaging a recess defined in body member 25, 125, respectively.

In a further alternative embodiment of a suitable engagement mechanism shown in FIGS. 4A and 4B for example, an axially bored opening 12 is provided through the bottom of the axial bore 20 (described below) of body member 25. A threaded retaining screw 13 is inserted through opening 12 and threaded into a threaded bore 38 that is provided in drive spindle 18. In the FIG. 4A embodiment, the drive spindle 18 has a tapered mount 15, and screw 13 is necessary to attach spindle 18 and chuck 10. However, in the embodiment of FIG. 4B, the back end of chuck device 10 is threaded onto drive spindle 18, and screw 13 provides an extra measure of attachment between spindle 18 and chuck 10.

The engagement mechanism of the present invention can include a mounting mechanism for facilitating automated attachment of the chuck's body member to a driving spindle of a machine tool. The mounting mechanism is applicable generally to any type of chuck device. As shown in FIGS. 4C and 5 for example, the mounting mechanism can include an axially bored mounting opening 11, 111, respectively, configured to receive one of the group consisting of a Torx head tool, an Allen head tool, and a square head tool. Such a tool can be inserted into mounting opening 11, 111, pick up the chuck, carry the chuck to the machine tool, and move the back end of the chuck body 25, 125 into alignment and engagement with the machine tool's drive spindle 18, 118. If the drive spindle attaches to the body member 25, 125 by threaded engagements as shown in FIGS. 1, 4B, 4C, and 5 for example, then the mounting tool can be rotated to automatically thread the chuck 10, 110 onto the threaded end of the drive spindle 18, 118.

Figure 2:
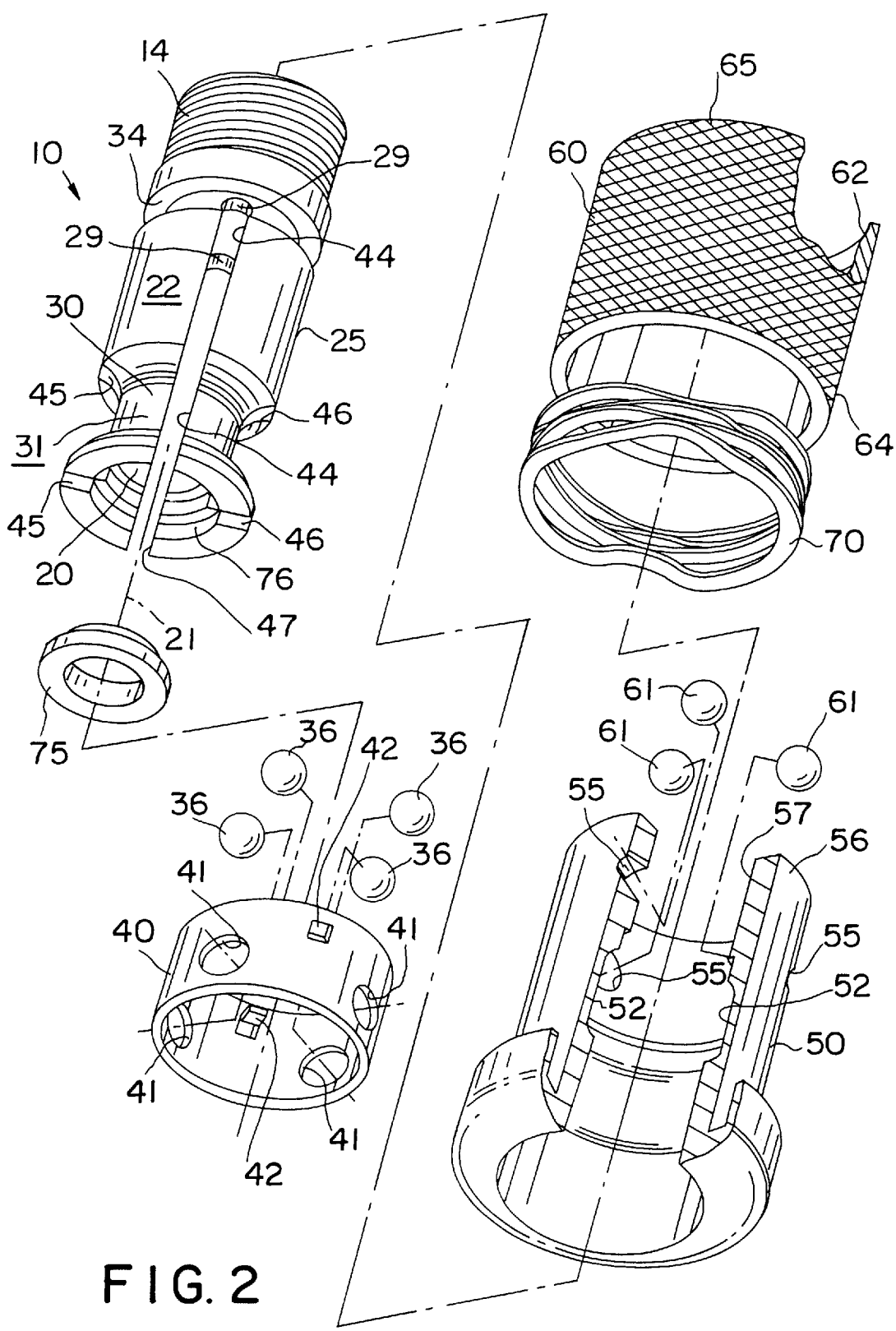
FIG. 2 is an elevated perspective assembly view of the chuck device shown in FIG. 1.
Figure 7:
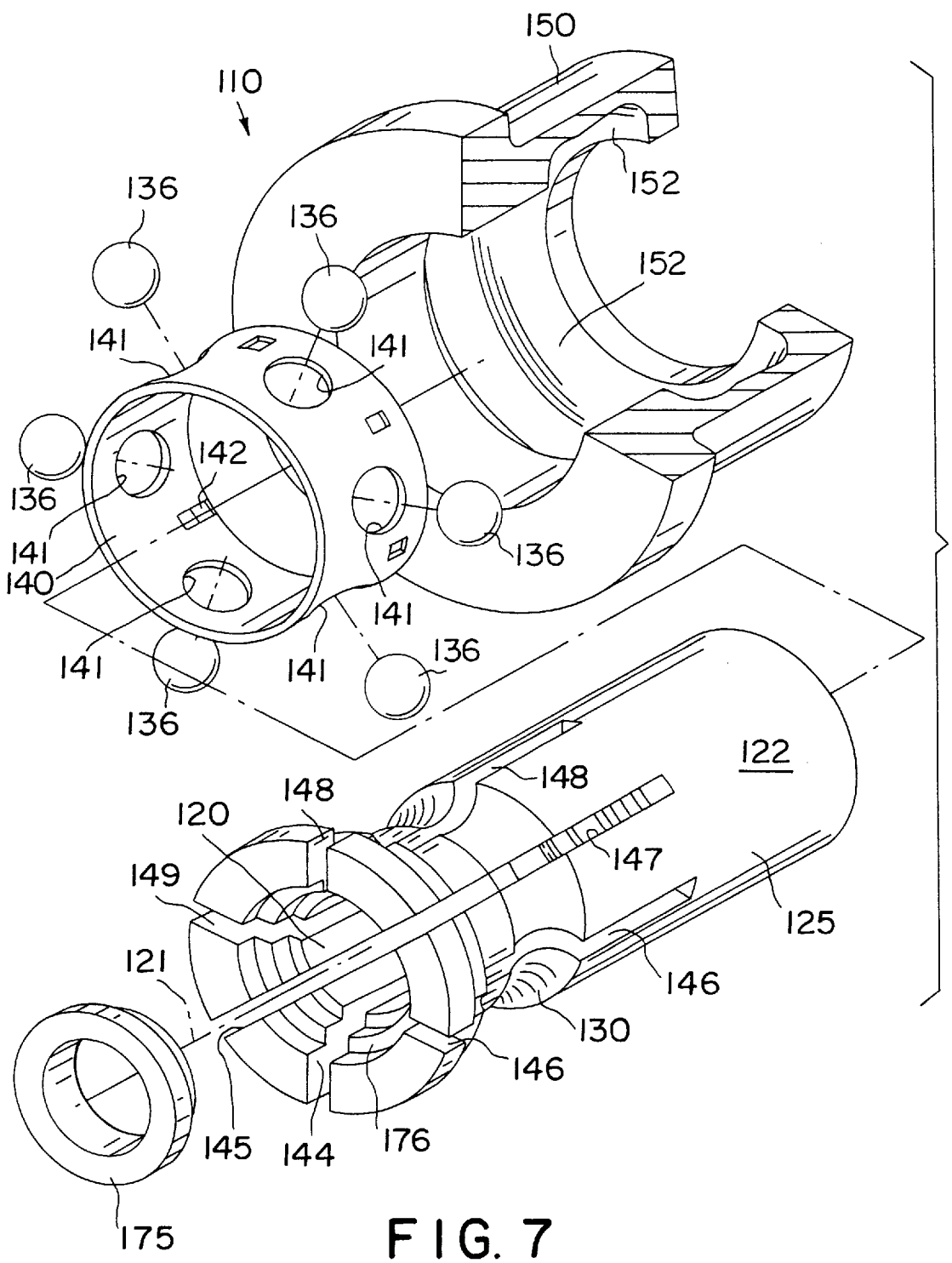
FIG. 7 is an elevated perspective assembly view of the chuck device shown in FIG. 5 with the gripping sleeve partially cut away.

In accordance with the present invention, the body member includes a bore that is axially defined within the body member about a central longitudinal axis. This so-called axial bore is defined by an interior surface of the body member and is configured for receipt of a tool shank that has a cylindrical exterior surface and thus has a circular transverse cross-section. As shown in FIGS. 2 and 7 for example, an axial bore 20, 120 is defined within body member 25, 125 so as to elongate in the axial direction relative to body member 25, 125. Axial bore 20, 120 is disposed symmetrically about a central longitudinal axis 21, 121 of body member 25, 125, as respectively shown in FIGS. 2 and 7 for example.

As shown in FIGS. 1–8C for example, body member 25, 125 further defines an exterior surface 22, 122. As shown in FIGS. 1, 3, 4, 5, and 8C for example, body member 25, 125 further defines an annular wall 28, 128 disposed between part of the length of exterior surface 22, 122 and more than the entire length of the interior surface that defines axial bore 20, 120. As shown in FIGS. 1, 3, 4, 5, and 6 for example, at least a first slit 44, 144 is defined through body member 25, 125 and in particular is defined by wall 28, 128 thereof. First slit 44, 144 axially extends from the free edge of the front end of body member 25, 125 and elongates toward the back end of body member 25, 125. First slit 44, 144 is defined to extend radially through the exterior surface 22, 122 and interior surface of body member 25, 125 and thus communicates with axial bore 20, 120 of body member 25, 125. Similar to first slit 44, 144 and as shown in FIGS. 2 and 7 for example, body member 25, 125 further defines at least a second slit 46, 146 radially therethrough and communicating with axial bore 20, 120. The second slit 46, 146 extends axially from the front end and elongates toward the back end of body member 25, 125.

Figure 6:
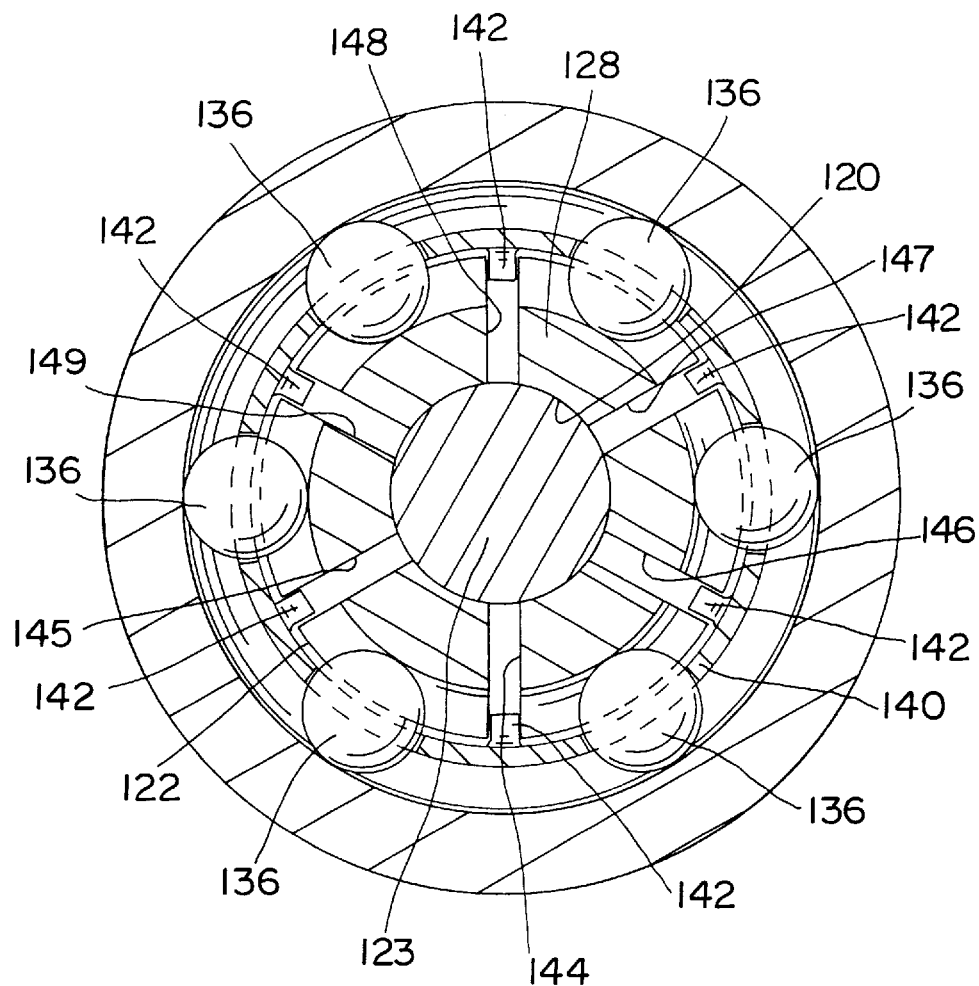
FIG. 6 is a cross-sectional view of components of the device of FIG. 5 with the gripping sleeve in the gripping position and the cam elements in the locked position and taken along the line of sight indicated by arrows designated 6—6 in FIG. 5.

A plurality of slits 45, 145, 47, 147, 148, 149 similar to the first slits 44, 144 and second slits 46, 146 are similarly disposed and symmetrically spaced apart from one another, preferably in parallel arrangement as shown in FIGS. 2, 6 and 7 for example. Four slits 44, 45, 46, 47 are provided symmetrically in the FIG. 2 embodiment, and six slits 144, 145, 146, 146, 148, 149 are symmetrically disposed in the embodiment of FIGS. 6 and 7. In each embodiment, all of the slits cooperate to render the body member 25, 125 diametrically flexible and circumferentially flexible so as to permit both expansion and contraction of the diameter and circumference of the body member 25, 125 upon the application of the appropriately directed forces. Moreover, body member 25, 125 is composed desirably of material such as stainless steel that enables the body member with these slits to be radially compressed and expanded repeatedly in a resilient fashion.

In a presently preferred embodiment of the present invention, a stress-relief hole can be provided at one end of each slit formed in the body member. As shown in FIGS. 1–4C for example, the effectiveness of slits 44, 45, 46, 47 is further enhanced by providing a stress relief hole 29 disposed in communication with the rearward end of each axially extending, elongated slit 44, 45, 46, 47.

In further accordance with the present invention, the body member further includes at least one axially extending cam pocket defined therein and disposed near the front end of the body member. The cam pocket is configured for receiving at least part of a cam element therein and provides a cam engaging surface. As shown in FIGS. 2 and 7 for example, exterior surface 22, 122 of body member 25, 125 further defines a cam pocket 30, 130, which extends circumferentially completely around body member 25, 125. Cam pocket 30, 130 also extends in the axial direction and is disposed near the front end of body member 25, 125. The depth of cam pocket 30, 130 is measured in the radial direction from longitudinal axis 21, 121 and is constant around the circumference.

Figure 3A:
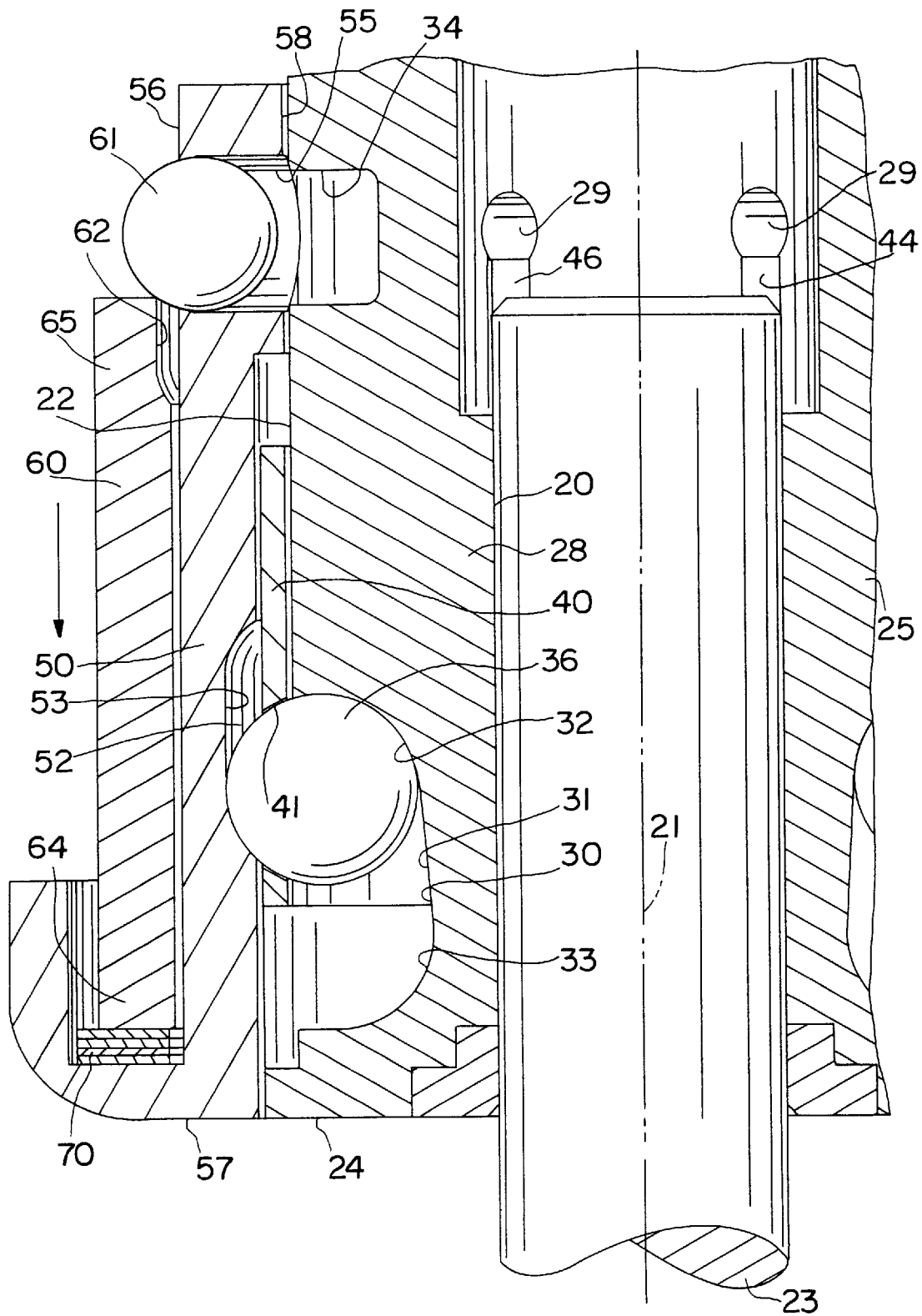
FIG. 3A is a partial axial cross-sectional view of the chuck device of FIG. 1 shown with the locking sleeve in the unlocked position and the gripping sleeve in the gripping position.
Figure 3B:
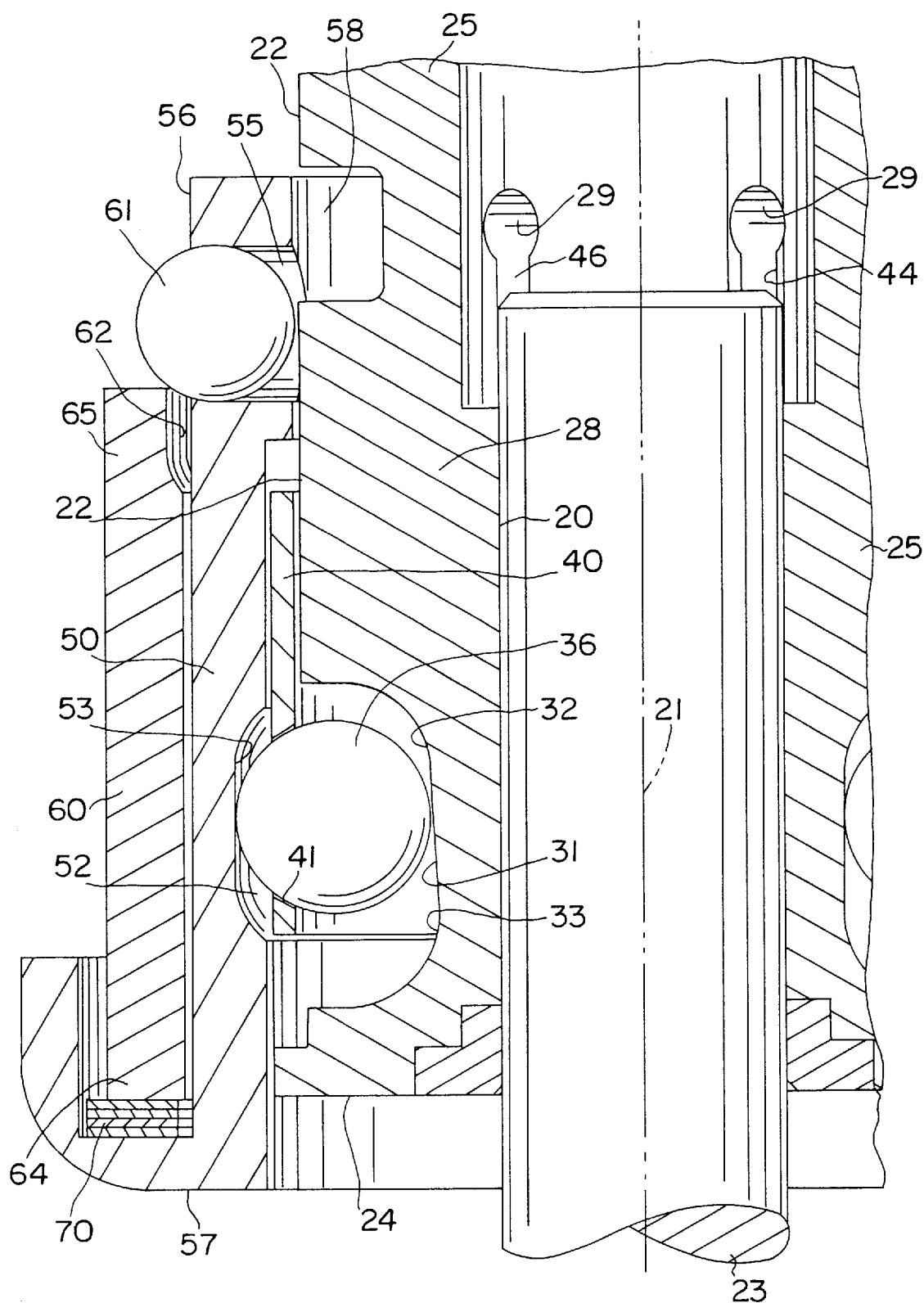
FIG. 3B is a partial axial cross-sectional view of the chuck device of FIG. 1 shown with the locking sleeve in the unlocked position and the gripping sleeve in a position between the gripping position and the release position.
Figure 3C:
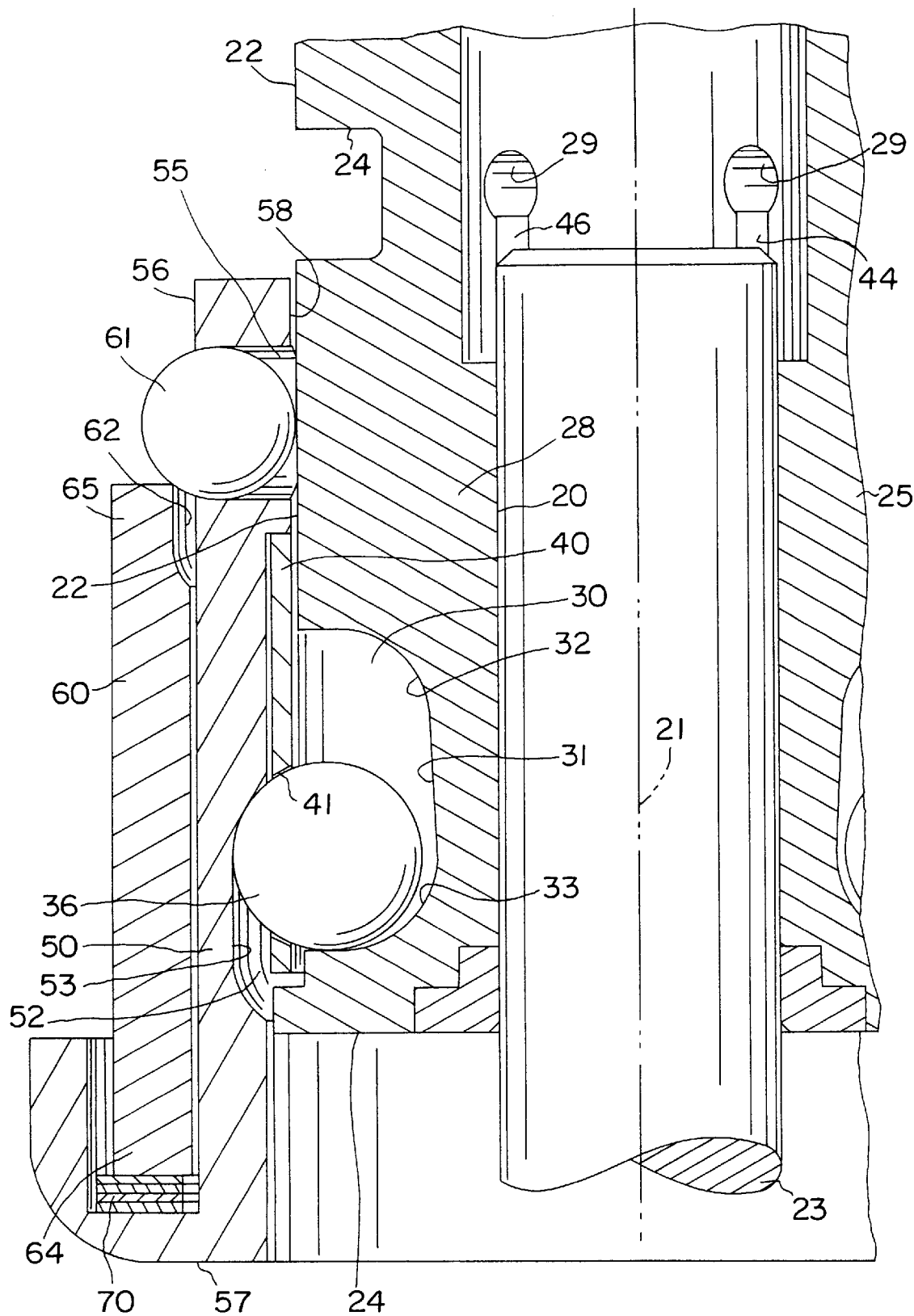
FIG. 3C is a partial axial cross-sectional view of the chuck device of FIG. 1 shown with the locking sleeve in the unlocked position and the gripping sleeve in the release position.

In a preferred embodiment shown in FIGS. 3A, 3B, and 3C for example, cam pocket 30 is configured with a canted floor 31 wherein the radial distance between floor 31 and central longitudinal axis 21 decreases when proceeding from the cam pocket's relatively shallow portion 32, which is disposed closer to the back end of body member 25, toward the cam pocket's relatively deep portion 33, which is disposed closer to the front end of body member 25. The cam pocket's relatively shallow portion 32 is also known as the gripping portion 32, while the cam pocket's relatively deep portion 33 is also known as the release portion 33.

Figure 8A:
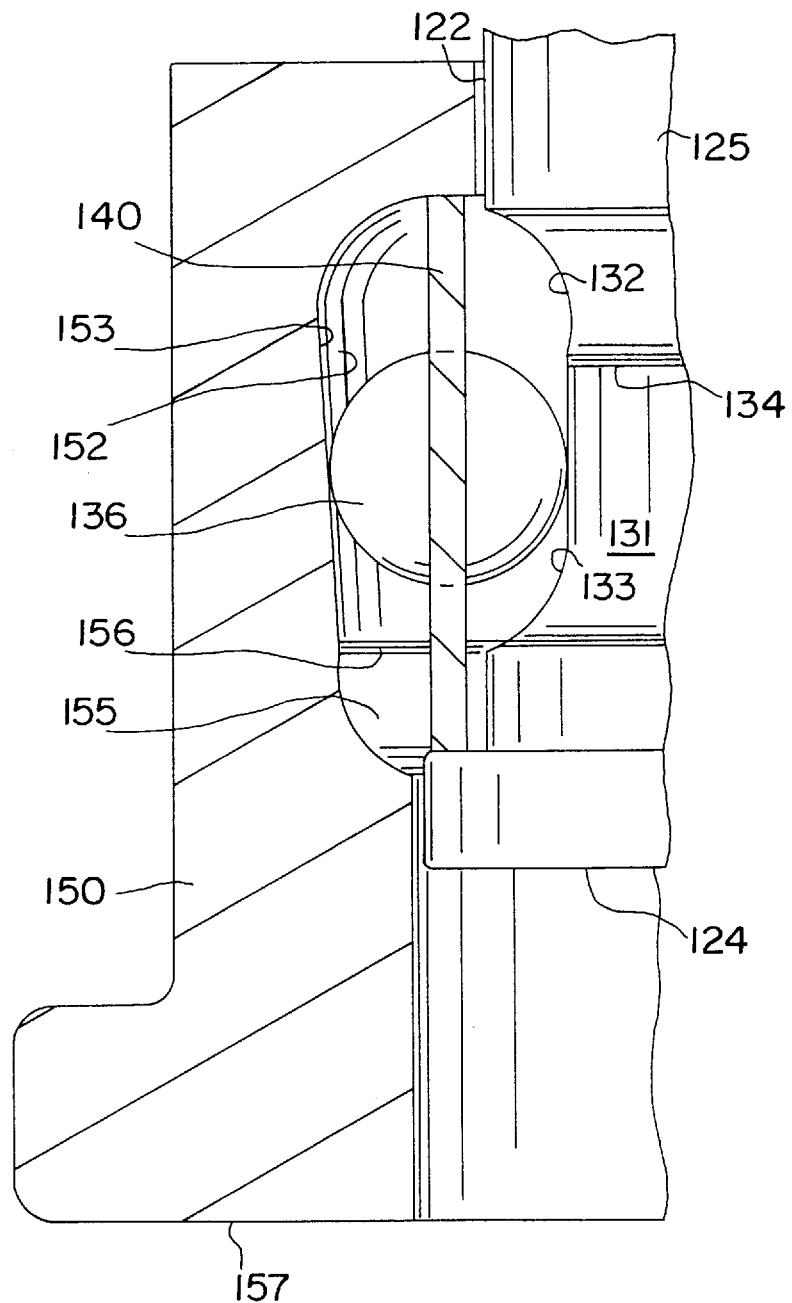
FIG. 8A is a partial axial cross-sectional view of the chuck device of FIG. 5 shown with the gripping sleeve in the release position and the cam element in the unlocked position.
Figure 8B:
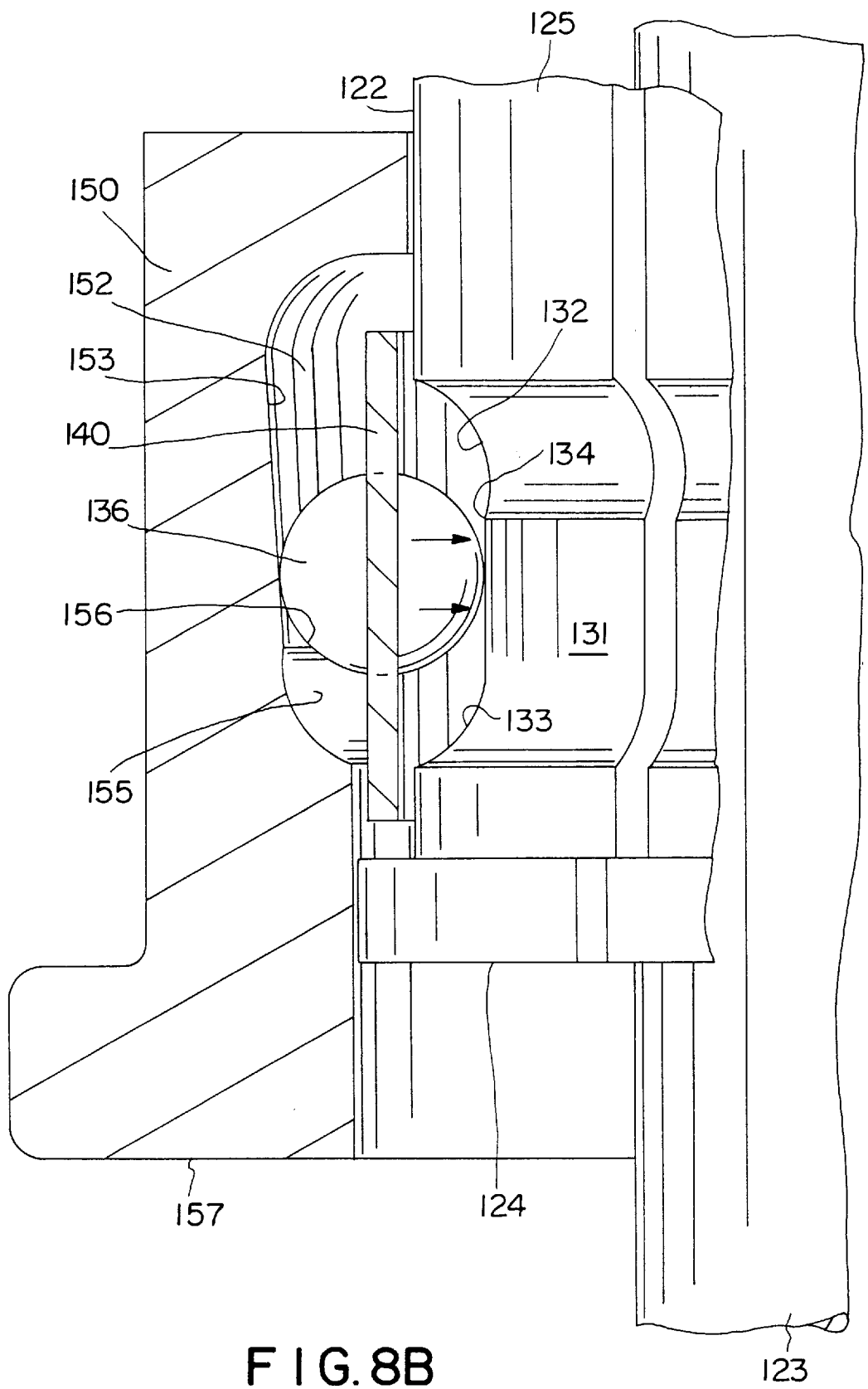
FIG. 8B is a partial axial cross-sectional view of the chuck device of FIG. 5 shown with the gripping sleeve in the release position and the cam element in a position between the unlocked position and the locked position.
Figure 8C:
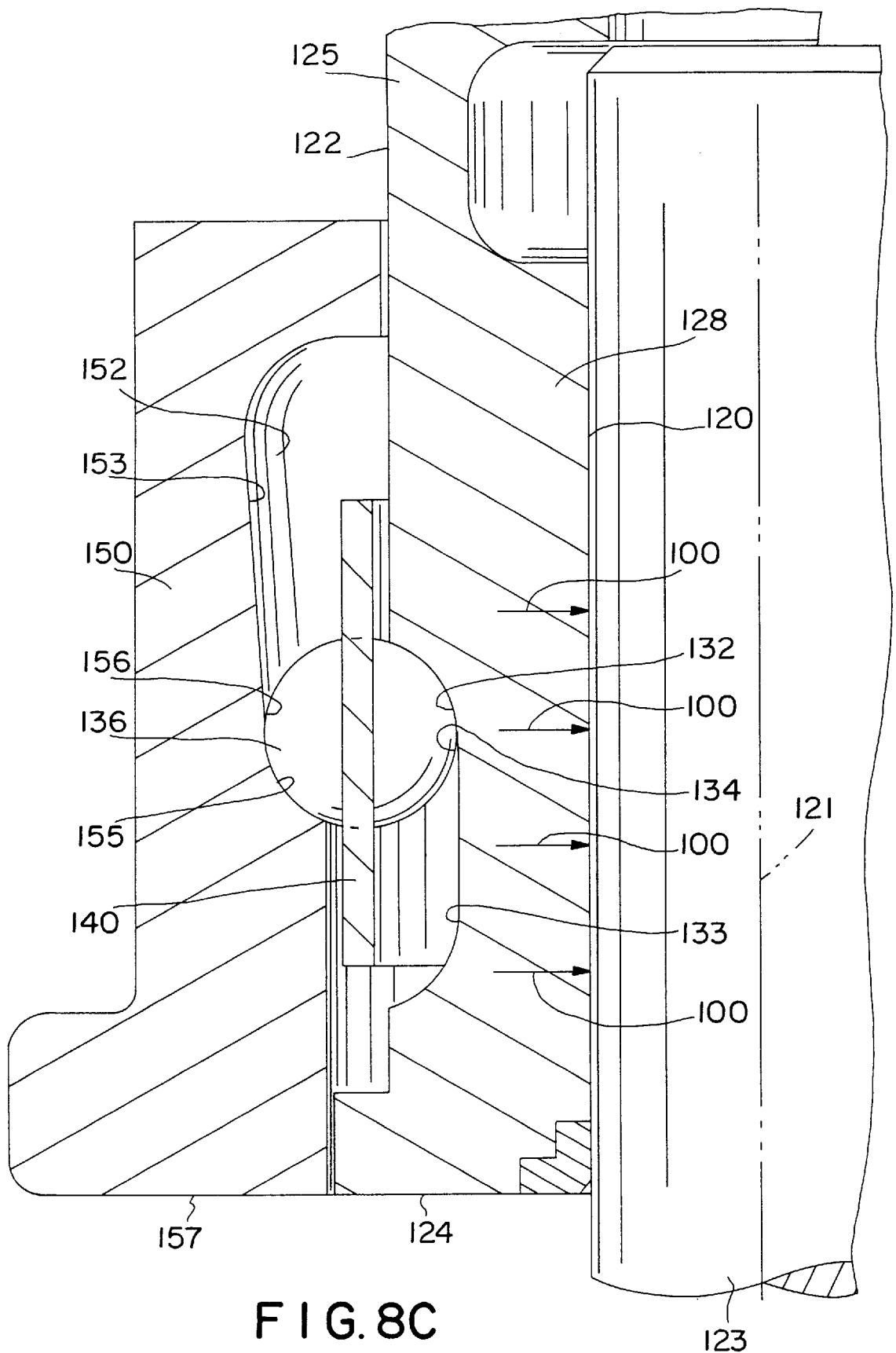
FIG. 8C is a partial axial cross-sectional view of the chuck device of FIG. 1 shown with the gripping sleeve in the gripping position and the cam element in the locked position.

In an alternative embodiment shown in FIGS. 8A, 8B, and 8C for example, cam pocket 130 is configured with a bifurcated floor 131 wherein a retaining ridge 134 separates a gripping portion 132, which is disposed closer to the back end of body member 125, from a release portion 133, which is disposed closer to the front end of body member 125. The depth of cam pocket 130 as measured by the radial distance between floor 131 and central longitudinal axis 121, is relatively constant for release portion 133 and relatively deeper for gripping portion 132.

The tool-less machine tool chuck device of the present invention has means for holding the shank of the tool bit in the chuck. As shown in FIGS. 1–3C and 5–8C for example, at least one cam element 36, 136 forms a part of this tool shank holding means and is selectively seated against the floor 31, 131 of cam pocket 30, 130, wherein in a gripping position the cam element 36, 136 is disposed in the gripping portion 32, 132 of cam pocket 30, 130 so as to apply increased pressure that reduces relatively the diameter of axial bore 20, 120 of body member 25, 125 to grip the tool shank 23, 123 in chuck device 10, 110. Similarly, in a release position, cam element 36, 136 is disposed in the release portion 33, 133 of cam pocket 30, 130 so as to apply reduced pressure that increases relatively the diameter of axial bore 20, 120 to release the tool shank 23, 123 from chuck device 10, 110. A plurality of cam elements 36, 136 is provided, and cam elements 36, 136 are symmetrically disposed circumferentially about cam pocket 30, 130. In a preferred embodiment shown in FIG. 2, four cam elements 36 are disposed in cam pocket 30. Similarly, in an alternative embodiment shown in FIGS. 6 & 7, six cam elements 136 are disposed in cam pocket 130.

In further accordance with the present invention, a means is provided to retain the cam elements symmetrically disposed circumferentially about the cam pocket of the body member. This symmetrical arrangement ensures that as pressure is transmitted radially through the cam elements to the body member, the body member is squeezed (or unsqueezed) uniformly about its circumference. As shown in FIGS. 2 and 7 for example, this means of retaining alignment of the cam elements 36, 136 is provided by an annular cage member 40, 140 that is disposed coaxially about body member 25, 125 and axially movable relative to body member 25, 125. Cage member 40, 140 defines at least one cage opening 41, 141 configured to receive one cam element 36, 136 and retain one cam element 36, 136 therein. Each cage member defines a separate cage opening 41, 141 for each cam element 36 136. Moreover, as shown in FIGS. 1, 2, 6 and 7 for example, cage member 40, 140 further defines an alignment tab 42, 142 engaging first slit 44, 144 of body member 25, 125 and thereby preventing rotation of cage member relative to body member 25, 125 about central longitudinal axis 21, 121. A plurality of alignment tabs 42, 142 is provided, and each tab 42, 142 is circumferentially offset from each other tab 42, 142 and from each cage opening 41, 141. Each alignment tab 42, 142 is configured and disposed to extend radially inwardly of cage member 40, 140 and be engaged with one of the slits 44, 45, 46, 47, 144, 145, 146, 147, 148, 149 formed in body member 25, 125. As cage member 40, 140 travels axially relative to body member 25, 125, tabs 42, 142 also move axially within the confines of their respective slits. Thus, cage openings 41, 141 and alignment tabs 42, 142 of cage member 40, 140 cooperate to maintain alignment of cam elements 36, 136 relative to first slit 44, 144 (and the other similar slits) during axial movement of cam elements 36, 136 from gripping position 32, 132 to release position 33, 133 relative to body member 25, 125.

The tool-less machine tool chuck device of the present invention includes a gripping sleeve member that defines an inner surface configured and disposed coaxially about the body member and axially movable relative to the body member. The inner surface of the gripping sleeve member also includes at least one cam element engaging surface defined therein and receiving at least one cam element at least partially therein. As shown in FIGS. 1, 2, 5, and 7 for example, a gripping sleeve member 50, 150 is formed as an annular member configured to be disposed coaxially about body member 25, 125 and axially movable relative to body member 25, 125. As shown in FIGS. 3A, 3B, 3C, 8A, 8B, and 8C for example, the inner surface of gripping sleeve member 50, 150 defines at least one cam element engaging surface 52, 152 configured for receiving at least one cam element 36, 136 at least partially therein. Cam element engaging surface 52, 152 extends circumferentially completely around body member 25, 125. Cam element engaging surface 52, 152 also extends in the axial direction and is configured and disposed to overlie cam pocket 30, 130 of body member 25, 125 during relative axial movement between gripping sleeve 50, 150 and body member 25, 125. The depth of cam element engaging surface 52, 152 is measured in the radial direction from longitudinal axis 21, 121. In a preferred embodiment shown in FIGS. 3A, 3B, and 3C for example, the depth of the floor 53 of cam element engaging surface 52 is constant around the circumference and axially of the interior surface of gripping sleeve member 50 so as to complement the axially varying depth of cam pocket 30 defined in the exterior surface of body member 25.

In an alternative embodiment shown in FIGS. 5, 8A, 8B, and 8C for example, the depth of the floor 153 of cam element engaging surface 152 is constant around the circumference of the interior surface of gripping sleeve member 50, but varies axially to complement the constant depth of each portion 132, 133 of the floor 131 of cam pocket 130 defined in the exterior surface of body member 125. As shown in FIG. 5 for example, cam element engaging surface 152 is configured with an axially sloped floor 153 wherein the radial distance between floor 153 and central longitudinal axis 121 increases when proceeding axially along central longitudinal axis 121 from the front end of body member 125 toward the back end of body member 125.

In an alternative embodiment shown in FIGS. 8A, 8B, and 8C, the cam element engaging surface 152 of gripping sleeve member 150 further defines at least one locking pocket 155 disposed near the front end of cam element engaging surface 152 and separated from the back end of cam element engaging surface 152 by a locking ridge 156. Locking pocket 155 is configured for receiving at least part of cam element 136 therein in a locked position of cam element 136. Locking pocket 155 extends circumferentially completely around the interior surface of gripping sleeve member 150. Locking pocket 155 also extends in the axial direction for a portion of cam element engaging surface 152. As shown in FIG. 8C for example, locking ridge 156 is disposed at a lesser radial distance from central longitudinal axis 121 than floor 153 on each opposite side of locking ridge 156 and acts as a detent for cam element 136. Moreover, as shown in FIG. 8C, when the front surface 157 of gripping sleeve 150 lies in the same plane as the front surface 124 of body member 125, cam element 136 is disposed partially in locking pocket 155 and partially in gripping portion 132 of cam pocket 130. When configured in the state shown in FIG. 8C, chuck device 110 is locked into position gripping shank 123 of the tool in a manner sufficient to enable the tool to perform its intended job on a workpiece.

In a preferred embodiment shown in FIGS. 2, 3A, 3B, and 3C for example, gripping sleeve member 50 further defines at least one locking channel 55 therethrough. As shown in FIG. 2 for example, three locking channels are symmetrically disposed about the circumference of gripping sleeve member 50 and near the back end of gripping sleeve 50. Each locking channel 55 is configured for receiving at least part of a retractable locking element 61 (described below) therein, and is sized to permit the associated locking element 61 to protrude radially beyond the exterior surface 56 of gripping sleeve 50 up to a predetermined extent. As shown in FIG. 3B for example, the surface that defines each locking channel 55 is conically shaped, with the base of the cone defined through the interior surface 58 of gripping sleeve 50 and narrowing as the locking channel 55 extends radially toward the exterior surface 56 of the gripping sleeve 50.

As shown in FIGS. 2, 3A, 3B and 3C for example, each retractable locking element 61 can be configured as a spherical element such as a ball wherein the diameter of each ball is smaller than the diameter of the base portion of each corresponding locking channel 55 defined through the interior surface of locking sleeve member 50. However, each locking channel 55 is sized smaller than the diameter of each ball 61 where such locking channel 55 opens through exterior surface 56 of gripping sleeve member 50. In this way, each ball 61 cannot pass from the interior surface 58 of gripping sleeve member 50 through its locking channel 55 and exit past the exterior surface 56 of gripping sleeve member 50.

In a preferred embodiment shown in FIG. 3C for example, exterior surface 22 of body member 25 further defines at least one locking socket 24 therein and configured for receiving at least part of a locking element 61 therein. As shown in FIG. 2 for example, locking socket 34 is formed as a continuous groove extending circumferentially around body member 25 near the back end thereof. As shown in FIG. 3A, when the front surface 57 of gripping sleeve 50 lies in the same plane as the front surface 24 of body member 25, locking socket 34 of body member 25 is substantially aligned with locking channel 55 of gripping sleeve 50.

Each locking element 61 is disposed at least partially in each locking channel 55 of gripping sleeve 50 and configured to move radially therein between one of a locked position (shown in FIGS. 1 and 4A–4C for example) and an unlocked position (shown in FIGS. 3A–3C for example). In the locked position of gripping sleeve 50 and locking element 61 (shown in FIGS. 1 and 4A–4C for example), locking element 61 is forced at least partially into locking socket 34 of body member 25 so as to prevent relative axial movement between body member 25 and gripping sleeve 50. In the unlocked position (shown in FIGS. 3A–3C for example), locking element 61 is free to move radially out of locking socket 34 of body member 25 so as to permit relative axial movement between body member 25 and gripping sleeve 50.

In accordance with the present invention, a means is provided to lock the gripping sleeve in the locking position wherein the tool shank is held by the chuck device. As shown in FIGS. 1 and 2 for example, in a preferred embodiment of this locking means for the gripping sleeve, a locking sleeve member 60 is disposed coaxially about gripping sleeve member 50 and axially movable relative to gripping sleeve member 50. As shown in FIGS. 3A, 3B, and 3C for example, locking sleeve member 61 defines a forward end 64 and a rearward end 65 disposed opposite forward end 64. Rearward end 65 is configured with a locking surface 62 to activate locking elements 61 when locking sleeve 60 is disposed in a locked position (shown in FIGS. 1 and 4A–4C for example) and to release locking elements 61 when locking sleeve 60 is disposed in an unlocked position (shown in FIGS. 3A–3C for example). As shown in FIGS. 3A, 3B, and 3C for example, locking surface 62 is formed as a surface that is beveled, sloped or inclined and located on the inside surface of locking sleeve 60 beginning at the free edge of rearward end 65 of locking sleeve 60.

As shown in FIGS. 3A, 3B, and 3C in a preferred embodiment of the locking means for the gripping sleeve 50, an axial spring mechanism 70 is disposed relative to the locking sleeve member 60 and the gripping sleeve member 50 so as to bias the locking sleeve member 60 axially relative to the gripping sleeve member 50. As shown in FIG. 1 for example, axial spring mechanism 70 biases locking sleeve member 60 axially relative to gripping sleeve member 50 to a locked position wherein locking sleeve member 60 activates locking elements 61. As shown in FIG. 4A, when at least one locking element 61 is disposed partially in locking socket 34 and partially in locking channel 55 of gripping sleeve 50, gripping sleeve 50 cannot move axially relative to body member 25. As shown in FIGS. 3A, 3B and 3C, locking sleeve member 60 is axially movable in the direction of arrow 101 (FIG. 3A) against the biasing force of spring mechanism 70 to an unlocked position wherein locking sleeve member 60 releases locking elements 61. Axial spring mechanism 70 compresses to permit locking sleeve member 60 to be axially movable against the biasing force of the spring mechanism 70 to a released position, which is shown in FIGS. 3A, 3B and 3C for presently preferred chuck embodiment 10 for example.

In accordance with the present invention, the chuck desirably secures the shank of the tool in a manner that reduces the incidence of marking of shanks that happen to be formed of relatively soft steel. The slits 44, 45, 46, 47, 144, 145, 146, 147, 148 and 149 of body member 25, 125 aid in accomplishing this trait of the chuck device 10, 110 of the present invention. These slits render the body member 25, 125 relatively flexible compared to an unslitted embodiment of the body member.

In a preferred embodiment shown in FIGS. 1, 2, 5 and 7 for example, a dust seal 75, 175 in the form of a resilient O-ring is received in a circumferential groove 76, 176 formed in the interior surface of body member 25, 125. Dust seal 75, 175 serves to prevent dust and debris generated during tool operation, from entering axial bore 20, 120 of body member 25, 125.

As shown in FIGS. 3C and 8A for example, the chuck device 10, 110, respectively, is configured in the release position that permits the shank 23, 123 of a tool to be inserted into or withdrawn from axial bore 20, 120 of body member 25, 125. Once the tool shank is inserted into axial bore 20, 120, gripping sleeve 50, 150 is moved axially relative to body member 25, 125 toward the back end of body member 25, 125 as shown in FIGS. 3B and 8B. This causes cam elements 36, 136 to move from release portion 33, 133 of cam pocket 30, 130 toward gripping portion 32, 132 of cam pocket 30, 130. Continued axial movement of gripping sleeve 50, 150 relative to body member 25, 125 toward the back end of body member 25, 125 results in the gripping position shown in FIGS. 3A and 8C for example. In the gripping position shown in FIGS. 3A and 8C for example, cam element engaging surface 52, 152 of gripping sleeve member 50, 150 forces cam elements 36, 136 into gripping portion 32, 132 of cam pocket 30, 130 of body member 25, 125. When disposed in gripping portion 32, 132 of cam pocket 30, 130, the cam elements 36, 136 apply pressure radially toward central longitudinal axis 21, 121 (as shown by the arrows 100 in FIG. 8C for example) so as to reduce the diameter of axial bore 20, 120 and compress body member 25, 125 around the shank 23, 123 of the tool disposed therein in a manner that grips the shank sufficiently to perform the intended job on a workpiece. Moreover, in the preferred embodiment shown in FIGS. 1 and 3A for example, when the operator releases locking sleeve 60 and spring mechanism 70 biases locking sleeve 60 so as to force locking element 61 into locking socket 34 of body member 25, chuck device 10 is locked in this gripping position. Similarly, in the alternative embodiment shown in FIGS. 5 and 8C for example, when the operator moves the gripping sleeve 150 axially toward the back end of body member 125 until cam elements 136 move past retaining ridge 134 and locking ridge 156, chuck device 110 is locked in this gripping position.

Figure 9A:
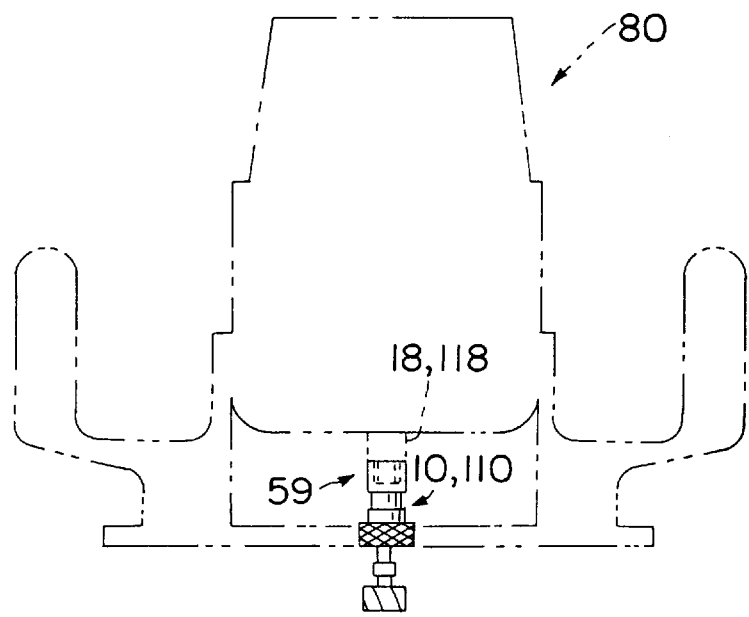
FIGS. 9A and 9B are diagrammatic views of a machine tool, such as a router, incorporating the quick-change chuck device according to the invention.
Figure 9B:
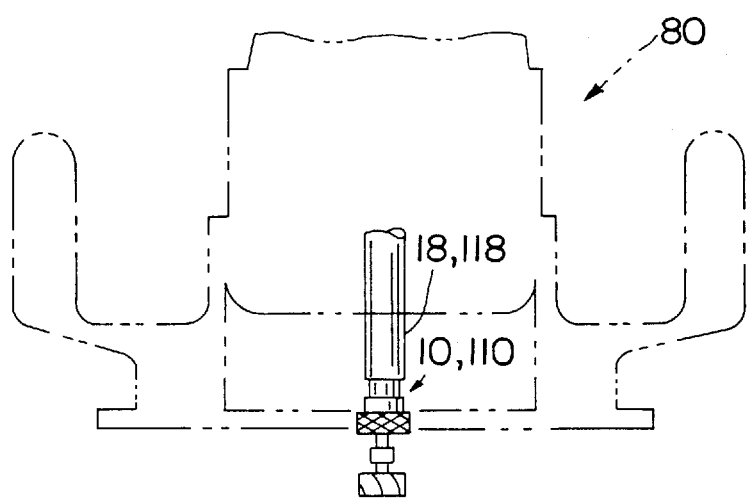

The present invention also encompasses any conventional machine tool configured for driving a tool bit which utilizes the quick-change chuck device discussed above. For example, referring to FIGS. 9A and 9B, a conventional machine tool 80 is illustrated in diagrammatic form. Machine tool 80 may comprise a router, such as illustrated, or any manner of machine tool such as a laminate trimmer, or any machine tool wherein it is desired to utilize a quickchange chuck device 10, 110 as described above. In the embodiment of FIG. 9A, device 10, 110 is mated with drive spindle 18, 118 of tool 80 through an appropriate locking device 59, such as the threaded engagement devices or socket devices discussed above. In the embodiment of FIG. 9B, chuck device 10, 110 is formed integral with drive spindle 18, 118.

Figure 10A:
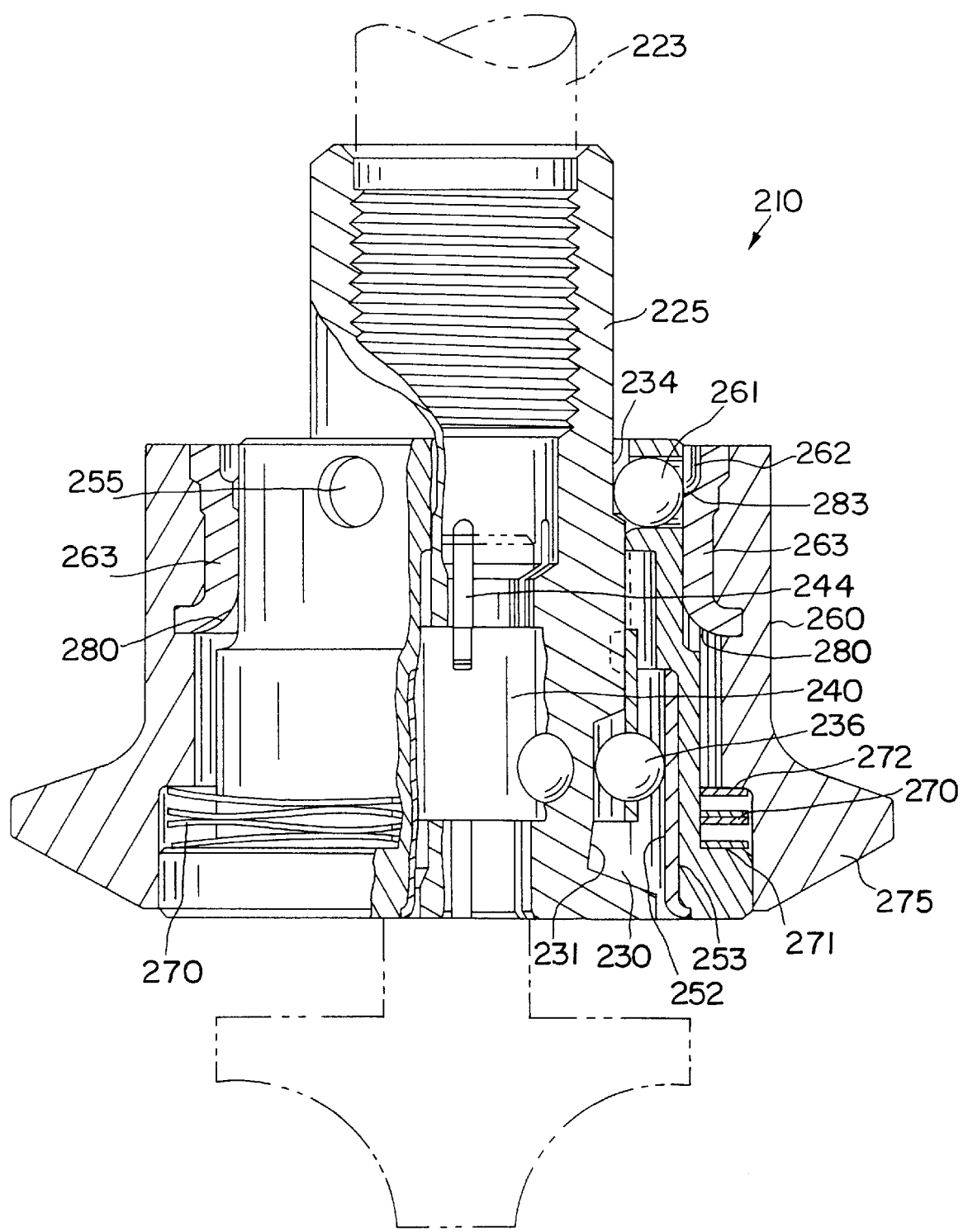
FIG. 10A is an axial cross-sectional view of an alternative embodiment of the chuck device according to the invention.
Figure 10B:
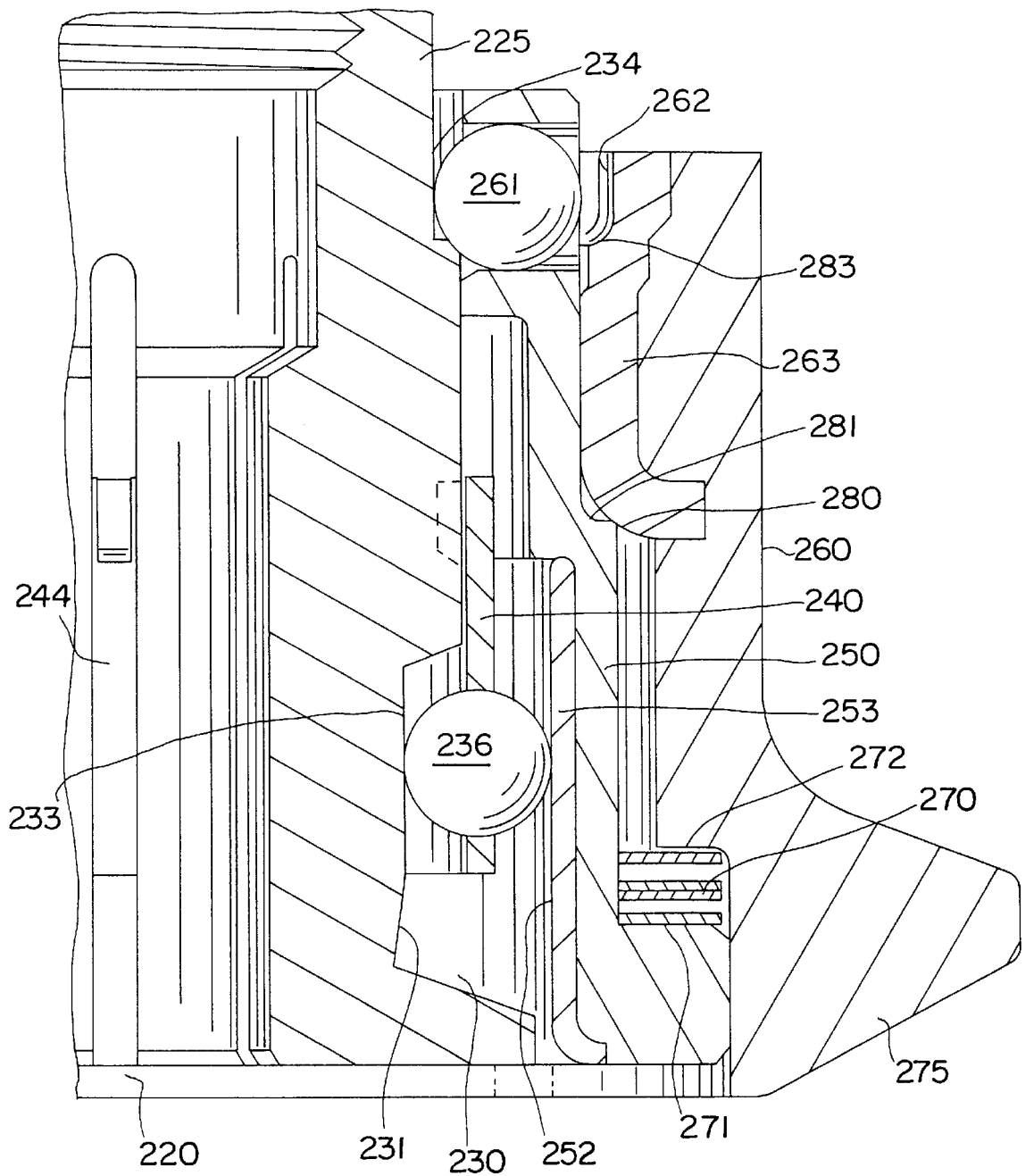
FIG. 10B is a partial axial cross-sectional view of the chuck device of FIG. 10A.
Figure 10C:
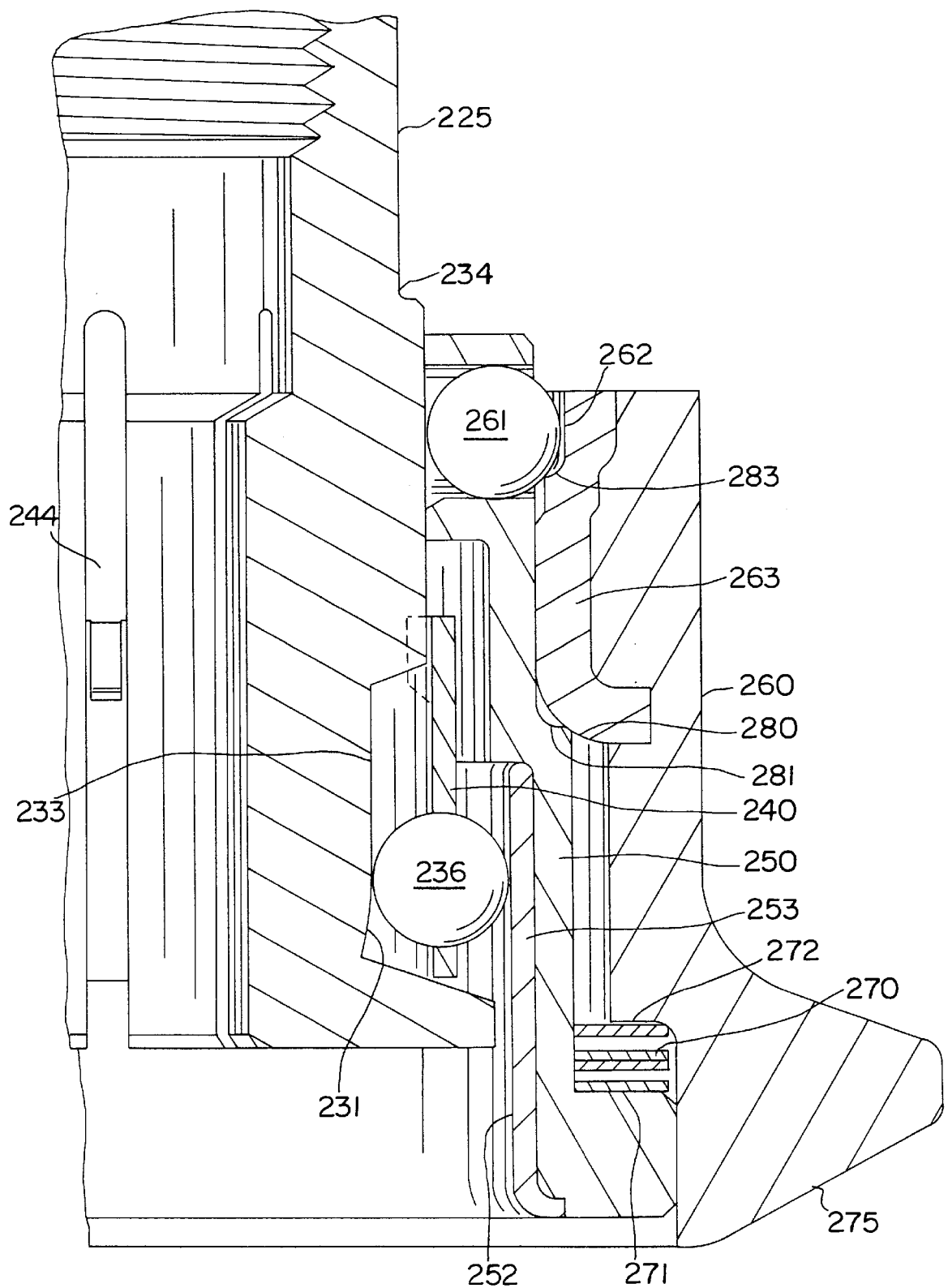
FIG. 10C is a partial axial cross-sectional view of the chuck device of FIG. 10A.
Figure 11:
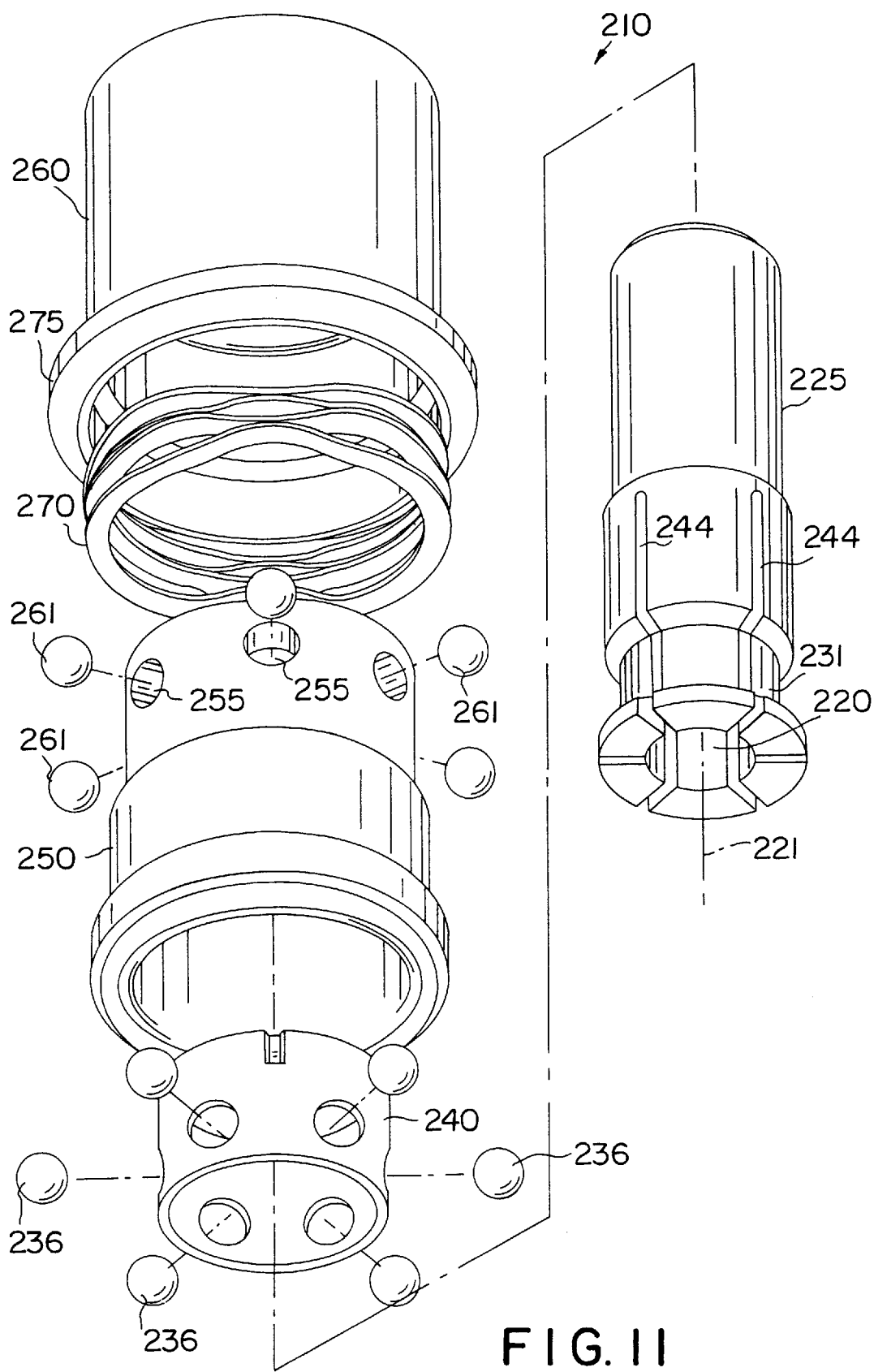
FIG. 11 is a perspective assembly view of the chuck device illustrated in FIG. 10A.

An alternative embodiment of the invention is illustrated in FIGS. 10A through 11. Many features of this embodiment are similar to the embodiments previously discussed and comparable elements of this embodiment are designated by numerals that differ numerically by a factor of 100 from the previously described embodiments. Accordingly, the previous discussion of the comparable elements is incorporated herein.

The quick change chuck device 210 according to this embodiment includes a body member 225 defining a central longitudinal axis 221 and a bore 220 defined therein for receipt of a circular tool shank. Body member 225 includes a plurality of axially extending slits 244 extending from a front end of the body member towards a back end of the body member. Accordingly, the portion of body member 225 incorporating slits 244 is radially compressible upon a tool shank inserted into a bore 220.

A gripping sleeve member 250 is disposed coaxially about body member 225 and is axially movable relative to the body member. Gripping sleeve member 250 is axially movable between a gripping or locked position as illustrated in FIG. 10A to a release position illustrated in FIG. 10C.

A cam element channel or pocket 230 is defined between an axially flat surface 252 of gripping sleeve member 250 and an axially sloped surface 231 of body member 225. In the embodiment illustrated, the axially flat surface 252 is defined by a metal insert 253 carried by gripping sleeve member 250. The axially sloped surface 231 is defined in body member 225 adjacent an axially flat surface 233. Thus, it should be understood, that cam element channel or pocket 230 defines a first section with a first radial dimension and a second section with a reduced second radial dimension which is less than that of the first radial dimension. In the embodiment illustrated, the radial dimension of channel 230 at the first section which includes the axially sloped surface 231 is greater than the radial dimension of the second section which includes the axially flat surface 233.

A cam element, such as the plurality of rolling balls 236, is movable within channel 230 by axial movement of the gripping sleeve member 250. Cam elements 236 are preferably carried in a cage member 240. Applicants have found that twelve rolling balls 236 is particularly suitable. In the gripping or locked position illustrated in FIG. 10A, cam elements 236 are located in the second section of cam element channel 230 having the reduced radial dimension. In this position, cam elements 236 radially compress the segments of body member 225 defined by axial slits 240. Radial compression of this portion of body member 225 causes the segments of the body member defined by slits 244 to radially compress and grip a tool shank inserted into bore 220.

Upon axially forward movement of gripping sleeve member 250, cam elements 236 are moved axially forward into the first section of cam element channel 230 having the greater radial dimension. This position of cam elements 236 is particularly illustrated in FIG. 10C. In this position, the segments of body member 225 defined by axial slits 244 are allowed to radially expand at least to an extent so that they release the tool shank carried in bore 220.

Cam elements 236 are axially moved within cam element channel 230 through frictional rolling engagement with the axially flat surface 252 of metal insert 253 and rolling contact with surfaces 233 and 231 of body member 225. Frictional contact is still maintained between cam elements 236 and surfaces 252, 231 even when the elements 236 are in the greater radial dimension section of pocket 231, as illustrated in FIG. 10C, so that cam elements 236 can be frictionally moved back into the gripping position as illustrated in FIG. 10A.

Chuck device 210 also includes a locking sleeve member 260 for manual actuation of gripping sleeve member 250. Locking sleeve member 260 extends coaxially relative to gripping sleeve member 250 and includes an annular flange 275 for manual grasping thereof. A spring element 271, such as a conventional wave spring, is disposed between opposing surfaces 271 of gripping sleeve member 250 and 272 of locking sleeve member 260. Thus, the two sleeve members are axially biased away from each other and chuck device 210 is biased in the gripping or locked position.

Chuck device 210 also includes a locking element to maintain the device in the gripping or locked position. In the embodiment illustrated, the locking element includes rolling bodies 261 carried in locking channels 255 formed in gripping sleeve member 250. A locking recess 234 is defined in body member 225 and rolling bodies 261 reside in this locking recess in the gripping position of the device, as illustrated in FIG. 10A. Locking sleeve member 260 includes a metal insert 263. Insert 263 includes a locking surface 262 generally radially opposite from locking recess 234 in the release position. In the gripping position of the device as illustrated in FIG. 10A, locking surface 262 extends axially rearward beyond rolling bodies 261 so that an axially flat section of insert 263 contacts bodies 261 and maintains these bodies in locking recess 234. This arrangement prevents axially forward movement of gripping sleeve member 250 until locking surface 262 of insert 263 is disposed radially opposite rolling bodies 261.

Metal insert 263 includes a shoulder 280 defined on the forward end thereof. As will be explained shortly, shoulder 280 cooperates with a shoulder 281 defined on gripping sleeve member 250 to move the gripping sleeve member in the axially forward direction.

To move the device from the gripping position illustrated in FIG. 10A to the release position illustrated in FIG. 10C, an operator grasps annular flange 271 of locking sleeve member 260 and pulls the locking sleeve member axially forward against the force of spring mechanism 270. Referring particularly to FIG. 10B, locking sleeve member 260 is pulled axially forward until locking surface 262 of metal insert 263 is radially opposite rolling bodies 261. At the same time, shoulder 280 of metal insert 263 comes into contact with shoulder 281 of gripping sleeve member 250 and further forward movement of locking sleeve member 260 causes rolling bodies 261 to move radially outward into the space defined by locking surface 262, which further allows for gripping sleeve member 250 to be moved axially forward along with locking sleeve member 260. Movement of gripping sleeve member 250 in the axially forward direction causes cam elements 236 to be rolled also axially forward due to the frictional engagement between surfaces 252, 233, and 231. Cam elements 236 move axially forward into the section of cam element channel 230 defined by the axially sloped surface 231 of body member 225. This configuration is illustrated particularly in FIG. 10C. In this position, the segments of body member 225 defined by axial slits 244 are allowed to move radially outward to such an extent that they release upon a tool shank inserted into bore 220. In this configuration, the operator simply removes the tool from chuck device 210.

In order to insert and lock a tool into the device 210, the operation is simply reversed. Chuck device 210 is in the configuration illustrated in FIG. 10C and a tool shank is inserted into bore 220. The operator then pushes the locking sleeve member 260 axially rearward which causes the gripping sleeve member 250 to also be moved axially rearward by engagement of a shoulder 283 of metal insert 263 with rolling bodies 261 until rolling bodies 261 move into locking recess 234 defined on body member 225, as illustrated in FIG. 10B. Once rolling bodies 261 have moved into recess 234, locking spring member 260 will then move axially rearward independent of gripping sleeve member 250 until the axially flat section of insert 263 locks rolling bodies 261 in locking recess 234, as illustrated in FIG. 10A.

As the locking sleeve member 260 and gripping sleeve member 250 are moved axially rearward in the operation just described, cam elements 236 within cage 240 are frictionally moved axially rearward into the second section of cam element channel 230 having the reduced radial dimension. In this position, cam elements 236 cause radial compression of the segments of body member 225 defined by axial slits 244 causing the segments to grasp upon the tool shank inserted into bore 220.

The present invention is suited for any manner of machine tool wherein a tool bit must be rotationally driven. The device is particularly suited for applications such as routers and laminate trimmers wherein relatively great rotational speeds are desired. However, this is in no means a limitation of the invention. In fact, it will be apparent to those skilled in the art that various modifications and variations can be made in the apparatus of the present invention without departing from the scope or spirit of the present invention.

While a preferred embodiment of the invention has been described using specific terms, such description is for illustrative purposes only, and it is to be understood that changes and variations may be made without departing from the spirit or scope of the following claims. Thus, it is intended that the present invention cover the modifications and variations of this invention provided they come within the scope of the appended claims and their equivalents.

What is claimed is:

1. A quick-change chuck device for receipt of an axially extending tool shank, comprising:
    a body member defining a central longitudinal axis and having an axially disposed bore defined therein for receipt of a circular tool shank, said body member further having at least a first axially extending slit therethrough extending from a front end thereof toward a back end thereof so that at least a portion of said body member defining said bore is radially compressible;
    a gripping sleeve member disposed coaxially about said body member and axially movable relative thereto;
    an axially extending cam element channel defined between opposing surfaces of said body member and said gripping sleeve member, said channel having a first section with a first radial width and a second section with a reduced second radial width less than that of said first radial width; and
    a cam element axially movable within said channel by axial movement of said gripping sleeve from a gripping position wherein said cam element is disposed in said second section of said channel causing compression of said body member radially compressible section so that said bore reduces in diameter and grips upon a tool shank inserted into said bore, said gripping sleeve axially movable to a release position wherein said cam element is disposed in said first section of said channel causing radial expansion of said body member radially compressible section so that said bore increases in diameter and releases a tool shank inserted therein.

2. The device as in claim 1, wherein said surface of said body member defining said cam element channel comprises an axially sloped surface which slopes toward said central longitudinal axis in said first section of said channel.

3. The device as in claim 2, wherein said surface of said gripping sleeve defining said cam element channel comprises an axially flat surface opposite said axially sloped surface, said axially flat surface frictionally engaging said cam element as said gripping sleeve moves axially relative to said body member thereby moving said cam element between said first and second sections of said cam element channel.

4. The device as in claim 3, wherein said axially flat surface is defined by a metal insert carried by said gripping sleeve.

5. The device as in claim 3, wherein said cam element comprises a rolling ball seated within said cam element channel.

6. The device as in claim 1, wherein said cam element channel extends circumferentially around said body member, said cam element comprising a plurality of rolling balls disposed in said channel.

7. The device as in claim 6, further comprising a cage member disposed coaxially between said body member and said gripping sleeve, said rolling balls carried by said cage element.

8. The device as in claim 1, wherein said body member further comprises a plurality of said axially extending slits uniformly circumferentially spaced therearound.

9. The device as in claim 1, further comprising a manually actuated locking sleeve member disposed coaxially about and axially movable relative to said gripping sleeve, said locking sleeve member moving said gripping sleeve between said gripping position and said release position upon manual actuation thereof.

10. The device as in claim 9, further comprising a spring mechanism operably disposed between said locking sleeve member and said gripping sleeve wherein said locking sleeve is axially movable relative to said gripping sleeve against the force of said spring mechanism.

11. The device as in claim 9, further comprising a locking element configured with said locking sleeve member and said gripping sleeve to releasably lock said gripping sleeve in said gripping position and release said gripping sleeve from said gripping position upon actuation of said locking sleeve member.

12. The device as in claim 11, wherein said locking element comprises a rolling body carried by said gripping sleeve and disposed in a locking recess defined in said body member in said gripping position of said gripping sleeve, said rolling body moved out of said locking recess by axial movement of said locking sleeve member allowing said gripping sleeve to move to said release position.

13. The device as in claim 9, wherein said locking sleeve member comprises an annular flange for manual grasping of said locking sleeve member.

14. The device as in claim 9, wherein said locking sleeve member is formed substantially of a plastic material.

15. A quick-change chuck device for receipt of an axially extending tool shank, comprising:
    a body member defining a central longitudinal axis and having an axially disposed bore defined therein for receipt of a circular tool shank, said body member further having a plurality of circumferentially spaced axially extending slits therethrough extending from a front end thereof toward a back end thereof so that at least a portion of said body member defining said bore is radially compressible;
    a gripping sleeve member disposed coaxially about said body member and axially movable relative thereto;
    an axially extending circumferential cam element channel defined between opposing surfaces of said body member and said gripping sleeve member wherein at least one of said opposing surface comprises an axially slanted surface which is axially slanted towards said longitudinal axis, said channel having a first section with a first radial width at said axially slanted surface and a second section opposite said first section with a reduced second radial width less than that of said first radial width;

a plurality of rolling body cam elements axially movable within said channel by axial movement of said gripping sleeve from a gripping position wherein said cam elements are disposed in said second section of said channel causing compression of said body member radially compressible section so that said bore reduces in diameter and grips upon a tool shank inserted into said bore, said gripping sleeve axially movable to a release position wherein said cam elements are disposed in said first section of said channel causing radial expansion of said body member radially compressible section so that said bore increases in diameter and releases a tool shank inserted therein;

a manually actuated locking sleeve member disposed coaxially about and axially movable relative to said gripping sleeve, said locking sleeve member moving said gripping sleeve between said gripping position and said release position upon manual actuation thereof; and a locking element configured with said locking sleeve member and said gripping sleeve to releasably lock said gripping sleeve in said gripping position and release said gripping sleeve from said gripping position upon actuation of said locking sleeve member.

* * * * *